(12) United States Patent
Xie et al.

(10) Patent No.: US 11,510,155 B2
(45) Date of Patent: Nov. 22, 2022

(54) COMMUNICATION METHOD, COMMUNICATIONS APPARATUS, AND COMPUTER-READABLE STORAGE MEDIUM

(71) Applicant: HUAWEI TECHNOLOGIES CO., LTD., Shenzhen (CN)

(72) Inventors: Xinqian Xie, Beijing (CN); Zhiheng Guo, Beijing (CN); Yongqiang Fei, Beijing (CN); Wenping Bi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 17/013,524

(22) Filed: Sep. 4, 2020

(65) Prior Publication Data

US 2020/0413351 A1    Dec. 31, 2020

Related U.S. Application Data

(63) Continuation of application No. PCT/CN2019/081451, filed on Apr. 4, 2019.

(30) Foreign Application Priority Data

Apr. 4, 2018   (CN) .......................... 201810300914.8

(51) Int. Cl.
*H04W 52/34*    (2009.01)
*H04W 52/38*    (2009.01)

(52) U.S. Cl.
CPC ........... *H04W 52/34* (2013.01); *H04W 52/38* (2013.01)

(58) Field of Classification Search
CPC ... H04W 52/24; H04W 52/38; H04W 72/042; H04W 72/0446; H04W 72/0453; H04W 72/128; H04L 5/0053
See application file for complete search history.

(56) References Cited

U.S. PATENT DOCUMENTS

2014/0376471 A1*  12/2014  Nishio ................ H04W 52/367
                                              370/329
2015/0063245 A1    3/2015  Gao et al.
(Continued)

FOREIGN PATENT DOCUMENTS

CN       103220768 A      7/2013
CN       103369650 A     10/2013
(Continued)

OTHER PUBLICATIONS

3GPP TSG RAN WG1 #91,R1-1720929:"On CA-related NR UL power control",Motorola Mobility, Lenovo,Reno, NV, USA, Nov. 27-Dec. 1, 2017,total 4 pages.

*Primary Examiner* — Jamal Javaid
(74) *Attorney, Agent, or Firm* — Rimon PC

(57) ABSTRACT

Various embodiments provide a communication method, a communications apparatus, and a computer-readable storage medium. In those embodiments, a first transmit power can be determined for transmitting first information in a first time unit on a first carrier and a second transmit power can be determined for transmitting second information in a second time unit on a second carrier. A third transmit power can be determined for transmitting the second information in a first time period and transmitting the second information in a second time period using the second transmit power or the third transmit power. The second information can be sent in the first time period using the third transmit power. In those embodiments, a sum of powers used by a terminal device to transmit two uplink carriers in a same time period does not exceed a maximum transmit power of the terminal device.

17 Claims, 8 Drawing Sheets

(56) References Cited

U.S. PATENT DOCUMENTS

| | | | |
|---|---|---|---|
| 2015/0163750 A1 | 6/2015 | Zhang et al. | |
| 2015/0245300 A1* | 8/2015 | Suzuki | H04W 52/247 |
| | | | 455/522 |
| 2016/0309427 A1 | 10/2016 | Cho et al. | |
| 2018/0084550 A1 | 3/2018 | Chen et al. | |
| 2018/0206263 A1* | 7/2018 | Lin | H04W 72/1289 |

FOREIGN PATENT DOCUMENTS

| | | |
|---|---|---|
| CN | 103826294 A | 5/2014 |
| CN | 104081838 A | 10/2014 |
| WO | 2013158511 A1 | 10/2013 |

* cited by examiner

COMMUNICATION METHOD, COMMUNICATIONS APPARATUS, AND COMPUTER-READABLE STORAGE MEDIUM

CROSS-REFERENCE TO RELATED APPLICATIONS

This application is a continuation of International Application No. PCT/CN2019/081451, filed on Apr. 4, 2019, which claims priority to Chinese Patent Application No. 201810300914.8, filed on Apr. 4, 2018. The disclosures of the aforementioned applications are hereby incorporated by reference in their entireties.

TECHNICAL FIELD

The present invention relates to the field of communications technologies, and in particular, to a communication method, a communications apparatus, and a computer-readable storage medium.

BACKGROUND

In a wireless communications system, generally, sending information by a network device to a terminal device is referred to as downlink communication, and sending information by the terminal device to the network device is referred to as uplink communication. In a long term evolution (LTE) or long term evolution advanced (LTE-A) communications system, duplex modes may mainly include a frequency division duplex (FDD) mode and a time division duplex (TDD) mode. In LTE-A, different frequency bands are planned for the FDD mode and the TDD mode. In 5G, different frequency bands are also planned for the FDD mode and the TDD mode, and a new supplementary downlink (SDL) and a new supplementary uplink (SUL) are further introduced.

For a wireless communications system working in the TDD mode, a downlink carrier and an uplink carrier are carriers of a same carrier frequency. In a 5G system, an uplink and downlink decoupling technology may be used for uplink and downlink communication. To be specific, in addition to using a carrier corresponding to the TDD mode to perform uplink and downlink communication, a terminal device may further use an additional uplink carrier to perform uplink communication. The additional uplink carrier is usually referred to as the supplementary uplink. In other words, the terminal device may simultaneously use two uplink carriers to perform uplink communication. In actual application, a sum of powers used by the terminal device to transmit two uplink carriers in a same time period may exceed a maximum transmit power of the terminal device. Therefore, a solution for resolving this problem through research is needed.

SUMMARY

Embodiments of the present invention provide a communication method, to prevent a sum of powers used by a terminal device to transmit two uplink carriers in a same time period from exceeding a maximum transmit power of the terminal device.

According to a first aspect, an embodiment of the present invention provides a communication method, and the method includes:

determining a first transmit power of first information to be sent in a first time unit on a first carrier and a second transmit power of second information to be sent in a second time unit on a second carrier, where the first time unit and the second time unit at least partially overlap, a time period that overlaps the first time unit in the second time unit is a first time period, and a time period that does not overlap the first time unit in the second time unit is a second time period;

determining a third transmit power of the second information to be sent in the first time period; and sending the second information in the second time period by using the second transmit power or the third transmit power, and sending the second information in the first time period by using the third transmit power.

This solution is performed by a terminal device, and the foregoing operations are all performed by the terminal device. In a 5G system, different frequency bands are planned for an FDD mode and a TDD mode, and a new SDL frequency band and a new SUL frequency band are further introduced. In this application, an SUL carrier is a carrier belonging to the SUL frequency band, a TDD carrier is a carrier belonging to a TDD frequency band, and an FDD carrier is a carrier belonging to an FDD frequency band. The first carrier and the second carrier may be two different carriers. For example, the first carrier is the SUL carrier, and the second carrier is the TDD carrier or the FDD carrier. For another example, the first carrier is the TDD carrier or the FDD carrier, and the second carrier is the SUL carrier. For another example, a subcarrier spacing of the first carrier is different from a subcarrier spacing of the second carrier. That the first time unit and the second time unit at least partially overlap may be that the first time unit and the second time unit completely overlap, may be that a part of the second time unit overlaps the first time unit, or may be that a part of the first time unit overlaps the second time unit. The terminal device may determine, according to a predefined rule or based on indication information from a network device, to reduce a transmit power of the second information in the first information and the second information. Optionally, the second information is information that is determined by the terminal device and that has a lower priority in the first information and the second information. The third transmit power is different from the second transmit power.

In this application, the terminal device can send same information in different time periods by using different transmit powers. This can be easily implemented.

In an implementation, the determining a third transmit power of the second information to be sent in the first time period includes:

if a sum of the first transmit power and the second transmit power is greater than or equal to a maximum transmit power, determining the third transmit power of the second information to be sent in the first time period, where the third transmit power is less than the second transmit power.

The maximum transmit power is a maximum transmit power of the terminal device. The maximum transmit power may be determined by the terminal device based on a capability of the terminal device, may be configured by the network device for the terminal device, or may be pre-specified, for example, may be a transmit power value specified in a protocol. This is not limited in this application.

Optionally, the third transmit power is 0, to be specific, the second information is not sent in the first time period. Optionally, when the terminal device does not support simultaneous sending of the first carrier and the second carrier, the third transmit power is determined as 0.

In this application, after determining that a sum of transmit powers of two pieces of to-be-sent information exceeds the maximum transmit power of the terminal device, the terminal device reduces a transmit power of one of the two pieces of to-be-sent information, so that a transmit power of the terminal device does not exceed the maximum transmit power of the terminal device.

In an implementation, the first carrier is the supplementary uplink SUL carrier, and the second carrier is the time division duplex TDD carrier or the frequency division duplex FDD carrier; or the subcarrier spacing of the first carrier is less than the subcarrier spacing of the second carrier.

Optionally, the first carrier is the TDD carrier or the FDD carrier, and the second carrier is the SUL carrier. Optionally, the subcarrier spacing of the first carrier is greater than the subcarrier spacing of the second carrier. The terminal device may determine, according to the predefined rule, to reduce the transmit power of the second information in the first information and the second information. The predefined rule may be: reducing a transmit power of information carried on a carrier with a smaller subcarrier spacing in the first carrier and the second carrier; reducing a transmit power of information carried on a carrier with a larger subcarrier spacing in the first carrier and the second carrier; reducing a transmit power of information carried on the SUL carrier in the SUL carrier and the TDD carrier; reducing a transmit power of information carried on the TDD carrier in the SUL carrier and the TDD carrier; reducing a transmit power of information carried on the SUL carrier in the SUL carrier and the FDD carrier; or reducing a transmit power of information carried on the FDD carrier in the SUL carrier and the FDD carrier.

In this application, the terminal device determines, from a perspective of a carrier, information whose transmit power needs to be reduced in two pieces of to-be-sent information. This uses a feature that different carriers have different transmission properties is used, and improves transmission performance.

In an implementation, the first information and the second information are sounding reference signals SRSs of a same type, the first carrier is the TDD carrier or the FDD carrier, and the second carrier is the SUL carrier, where the type is one of periodic or aperiodic.

A periodic SRS is an SRS that is cyclically sent according to a specific rule; and an aperiodic SRS is an SRS that is sent in a triggered mode.

In an implementation, the terminal device may determine, based on the indication information sent by the network device, information whose transmit power needs to be reduced in two pieces of to-be-sent information. For example, the method further includes:

receiving the indication information from the network device, where the indication information is used to indicate that a priority of the first carrier is higher than a priority of the second carrier, where the first carrier is the supplementary uplink SUL carrier, and the second carrier is the time division duplex TDD carrier or the frequency division duplex FDD carrier; or the first carrier is the time division duplex TDD carrier or the frequency division duplex FDD carrier, and the second carrier is the supplementary uplink SUL carrier; or the subcarrier spacing of the first carrier is less than the subcarrier spacing of the second carrier; or the subcarrier spacing of the first carrier is greater than the subcarrier spacing of the second carrier; and the determining a third transmit power of the second information to be sent in the first time period includes:

when determining, based on the indication information, that a priority of the first information is higher than a priority of the second information, determining the third transmit power of the second information to be sent in the first time period.

The terminal device may determine the priority of the first information and the priority of the second information based on the indication information. An order of the priority of the first carrier and the priority of the second carrier is consistent with an order of the priority of the first information and the priority of the second information. If the priority of the first carrier is higher than the priority of the second carrier, the priority of the first information is higher than the priority of the second information. If the priority of the first carrier is lower than the priority of the second carrier, the priority of the first information is lower than the priority of the second information. Therefore, the terminal device may determine the priority of the first information and the priority of the second information based on the priority of the first carrier and the priority of the second carrier. The network device may send different indication information to the terminal device based on different application scenarios. In other words, a manner in which the terminal device determines a priority of to-be-sent information is not fixed, and may be adjusted based on the indication information sent by the network device. For example, the terminal device determines, based on first indication information sent by the network device, that the priority of the first information is higher than the priority of the second information, or determines, based on second indication information sent by the network device, that the priority of the first information is lower than the priority of the second information.

In this application, the terminal device determines priorities of the two pieces of to-be-sent information based on the indication information sent by the network device. This is highly flexible, and can meet requirements of different scenarios.

In an implementation, the terminal device may determine, based on control information sent by the network device, information whose transmit power needs to be reduced in two pieces of to-be-sent information. For example, the method further includes:

receiving first control information and second control information from the network device, where the first control information is used to indicate a priority of the first information, and the second control information is used to indicate a priority of the second information; and the determining a third transmit power of the second information to be sent in the first time period includes:

when determining, based on the first control information and the second control information, that the priority of the first information is higher than the priority of the second information, determining the third transmit power of the second information to be sent in the first time period.

Both the first control information and the second control information are downlink control information.

In this application, the terminal device determines priorities of the two pieces of to-be-sent information based on the control information sent by the network device. This is highly flexible and real-time.

In an implementation, the first control information includes a first field, and the first field indicates the priority of the first information; and the second downlink control information includes a second field, and the second field indicates the priority of the second information; or a first mask indicates the priority of the first information, and the first mask is a cyclic redundancy check (Cyclic Redundancy Check, CRC) mask in the first control information; and a second mask indicates the priority of the second information, and the second mask is a cyclic redundancy check mask in the second control information.

A field included in control information is used to indicate a priority of uplink information scheduled by using the control information. This can be easily implemented. A cyclic redundancy check mask included in control information is used to indicate a priority of uplink information scheduled by using the control information. In this way, no additional field is needed, and relatively few control resources are consumed.

In this application, the terminal device may determine, based on a field included in control information or a cyclic redundancy check mask in the control information, a priority of uplink information scheduled by using the control information. This can be easily implemented.

In an implementation, a specific implementation of determining a transmit power of the second information in the second time period is provided. For example, the sending the second information in the second time period by using the second transmit power or the third transmit power includes:

when a demodulation reference signal is separately included in the first time period and the second time period, sending the second information in the second time period by using the second transmit power; or when a demodulation reference signal is not included in one of the first time period and the second time period, sending the second information in the second time period by using the third transmit power; or when a modulation scheme of the second information is quadrature amplitude modulation, sending the second information in the second time period by using the second transmit power; or when a modulation scheme of the second information is phase shift keying modulation, sending the second information in the second time period by using the third transmit power.

In this application, the terminal device controls the transmit power of the second information in the second time period. This can ensure that the network device can determine the transmit power of the second information in the second time period, and improve transmission performance.

In an implementation, another specific implementation of determining a transmit power of the second information in the second time period is provided. For example, the sending the second information in the second time period by using the second transmit power or the third transmit power includes:

when a demodulation reference signal is separately included in the first time period and the second time period, and/or a modulation scheme corresponding to the second information is phase shift keying modulation, sending the second information in the second time period by using the second transmit power; or when a demodulation reference signal is not included in one of the first time period and the second time period, and a modulation scheme of the second information is quadrature amplitude modulation, sending the second information in the second time period by using the third transmit power.

In this application, the terminal device controls the transmit power of the second information in the second time period. This can ensure that the network device can determine the transmit power of the second information in the second time period, and improve transmission performance.

According to a second aspect, another communication method is provided. The method includes:

sending, by a network device, indication information to a terminal device, where the indication information is used to indicate a priority of first information and a priority of second information, the first information is information to be sent by the terminal device in a first time unit on a first carrier by using a first transmit power, the second information is information to be sent by the terminal device in a second time unit on a second carrier by using a second transmit power, the first time unit and the second time unit at least partially overlap, a time period that overlaps the first time unit in the second time unit is a first time period, and a time period that does not overlap the first time unit in the second time unit is a second time period; and receiving, in the second time period, the second information that is sent by the terminal device by using the second transmit power or a third transmit power, and receiving, in the first time period, the second information that is sent by the terminal device by using the third transmit power, where the third transmit power is less than the second transmit power.

In this application, the network device indicates, by using the sent indication information, the priorities of the first information and the second information that are to be sent by the terminal device. In this way, when determining that a sum of transmit powers of the first information and the second information is greater than or equal to a maximum transmit power of the terminal device, the terminal device reduces a transmit power of information with a lower priority. This is highly flexible.

In an implementation, the indication information is used to indicate that a priority of the first carrier is higher than a priority of the second carrier, where the first carrier is a supplementary uplink SUL carrier, and the second carrier is a time division duplex TDD carrier or a frequency division duplex FDD carrier; or the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or a subcarrier spacing of the first carrier is greater than a subcarrier spacing of the second carrier.

In this application, the terminal device determines priorities of two pieces of to-be-sent information based on the indication information sent by the network device. This is highly flexible, and can meet requirements of different scenarios.

In an implementation, the sending, by a network device, indication information to a terminal device includes:

sending first control information and second control information to the terminal device, where the first control information is used to indicate the priority of the first information; the second control information is used to indicate the priority of the second information; the first control information includes a first field, and the first field indicates the priority of the first information; and the second downlink control information includes a second field, and the second field indicates the priority of the second information; or a first mask indicates the priority of the first information, and the first mask is a cyclic redundancy check mask in the first control information; and a second mask indicates the priority of the second information, and the second mask is a cyclic redundancy check mask in the second control information.

In this application, the terminal device determines priorities of two pieces of to-be-sent information based on the control information sent by the network device. This is highly flexible and real-time.

In an implementation, the first time unit includes any one of a subframe, a slot, a mini-slot, and a symbol; and the second time unit includes any one of a subframe, a slot, a mini-slot, and a symbol.

In an implementation, a type of the first information is the same as or different from a type of the second information.

In an implementation, the type of the first information includes at least one of the following: uplink data information, uplink control information, and random access information; and the type of the second information includes at least one of the following: uplink data information, uplink control information, and random access information.

According to a third aspect, a terminal device is provided. The terminal device includes units configured to perform the method in the first aspect.

According to a fourth aspect, a network device is provided. The network device includes units configured to perform the method in the second aspect.

According to a fifth aspect, an embodiment of the present invention provides another terminal device, including a processor, a transceiver, and a memory. The processor, the transceiver, and the memory are connected to each other. The memory is configured to store a computer program that supports a terminal in performing the foregoing methods. The computer program includes a program instruction, and the processor is configured to invoke the program instruction to perform the method in the first aspect.

According to a sixth aspect, an embodiment of the present invention provides another network device, including a processor, a transceiver, and a memory. The processor, the transceiver, and the memory are connected to each other. The memory is configured to store a computer program that supports a terminal in performing the foregoing methods. The computer program includes a program instruction, and the processor is configured to invoke the program instruction to perform the method in the second aspect.

According to a seventh aspect, an embodiment of this application provides a computer-readable storage medium. The computer storage medium stores a computer program, and the computer program includes a program instruction. When the program instruction is executed by a processor, the processor is enabled to perform the method in the first or the second aspect.

BRIEF DESCRIPTION OF DRAWINGS

To describe the technical solutions in the embodiments of the present invention more clearly, the following briefly describes the accompanying drawings for describing the embodiments of the present invention or the background.

DESCRIPTION OF EMBODIMENTS

Figure 1:
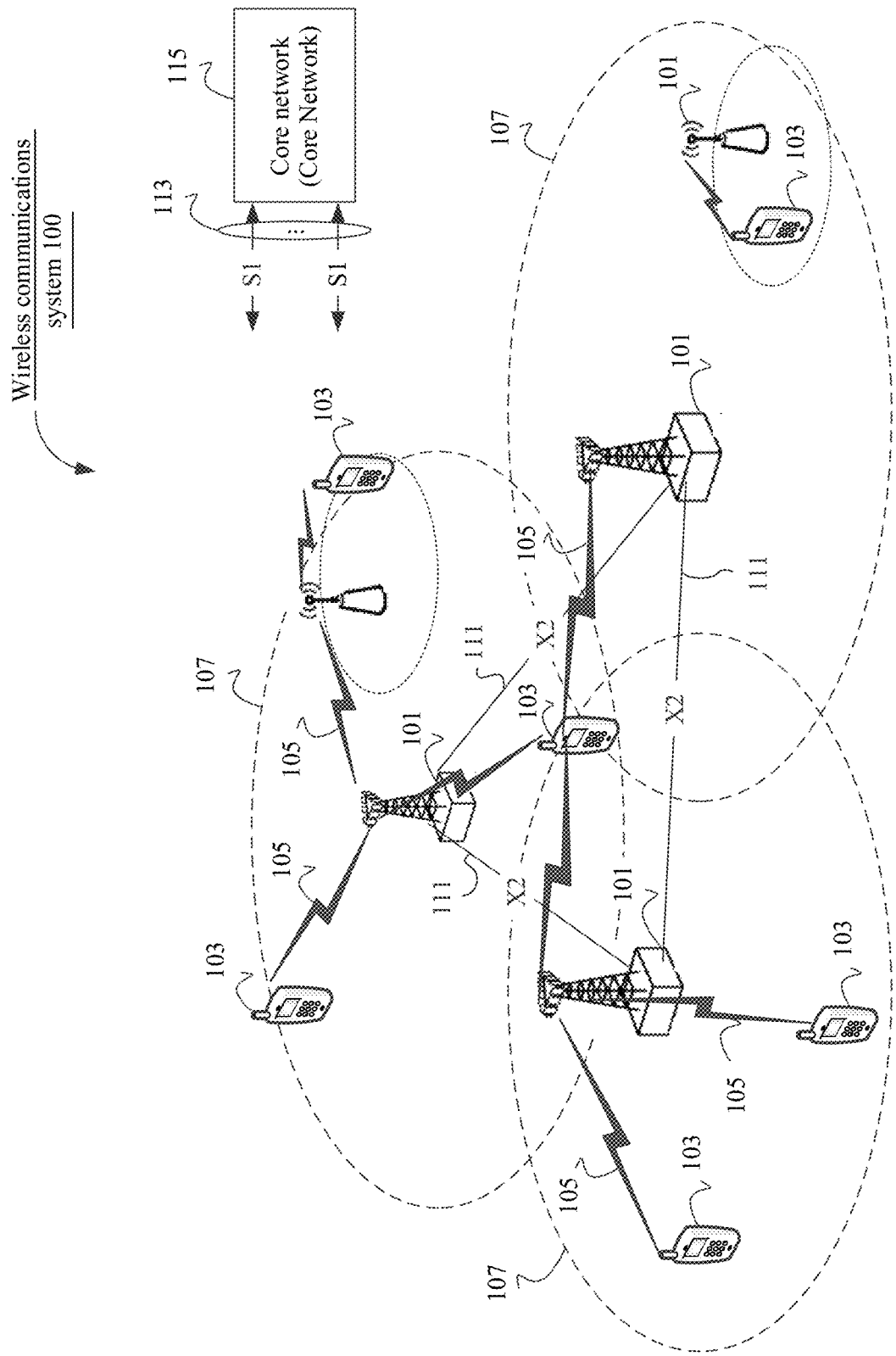
FIG. 1 is a schematic architectural diagram of a wireless communications system according to this application.

FIG. 1 shows a wireless communications system in this application. The wireless communications system is not limited to a long term evolution (LTE) system, and may alternatively be a future evolved 5th generation (5G) mobile communications system, a new radio (NR) system, a machine-to-machine (M2M) communications system, or the like. As shown in FIG. 1, the wireless communications system 100 may include one or more network devices 101, one or more terminal devices 103, and a core network 115.

The network device 101 may be a macro network device (macro eNodeB/NodeB), a micro network device (micro eNodeB/NodeB), a pico network device, a home network device (home eNodeB/NodeB), a distributed network device, or the like. This is not For example limited herein. The network device 101 may alternatively be a base station. The base station may be configured to communicate with one or more terminal devices, or may be configured to communicate with one or more base stations having some terminal functions (for example, communication between a macro base station and a micro base station). The base station may be a base transceiver station (BTS) in a time division synchronous code division multiple access (TD-SCDMA) system, an evolved NodeB (eNB) in an LTE system, or a base station in a 5G system or the new radio (NR) system. Alternatively, the base station may be an access point (AP), a transmission node (Trans TRP), a central unit (CU), or another network entity, and may include some or all of functions of the foregoing network entities.

The terminal devices 103 may be distributed in the entire wireless communications system 100, and may be static or mobile. In some embodiments, the terminal device 103 may be a mobile device, a mobile station, a mobile unit, an M2M terminal, a radio unit, a remote unit, a user agent, a mobile client, or the like.

For example, the network device 101 may be configured to communicate with the terminal device 103 through a wireless interface 105 under control of a network device controller (not shown). In some embodiments, the network device controller may be a part of the core network 115, or may be integrated into the network device 101. For example, the network device 101 may be configured to transmit control information or user data to the core network 115 through a backhaul (backhaul) interface 113 (for example, an Si interface). For example, the network devices 101 may also directly or indirectly communicate with each other through a backhaul (backhaul) interface 111 (for example, an X2 interface).

It should be noted that the wireless communications system 100 shown in FIG. 1 is merely intended to describe the technical solutions in this application more clearly, but is not intended to limit this present disclosure. A person of ordinary skill in the art may know that, as a network architecture evolves and a new service scenario emerges, the technical solutions provided herein are also applicable to a similar technical problem.

Figure 2:
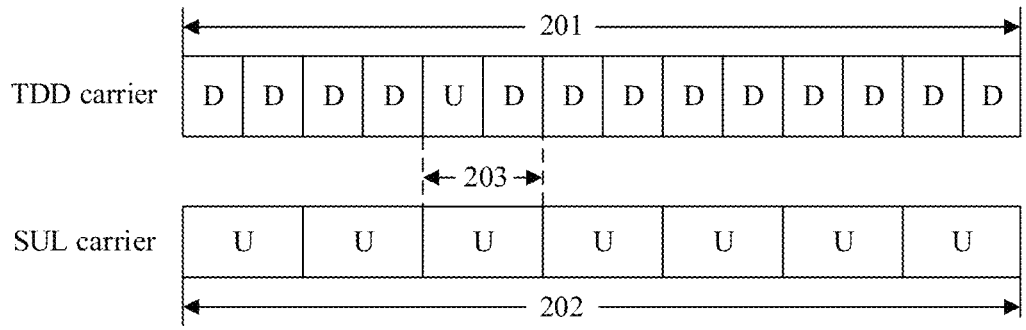
FIG. 2 is a schematic structural diagram of a signal sequence according to this application.

In the 5G system, a terminal device may simultaneously use two uplink carriers to perform uplink communication, and the two uplink carriers correspond to one downlink carrier. One of the two uplink carriers may be an SUL carrier, and the other may be a TDD carrier or an FDD carrier. For example, the terminal device may simultaneously use the TDD carrier and the SUL carrier to send uplink signals to a network device. FIG. 2 is a schematic structural diagram of a signal sequence according to this application. As shown in FIG. 2, 201 indicates a time period that corresponds to an uplink signal sent by a terminal device by using a TDD carrier and that corresponds to a downlink signal received by the terminal device by using the TDD carrier; and 202 indicates a time period corresponding to an uplink signal sent by the terminal device by using an SUL carrier. Each rectangle in FIG. 2 corresponds to one slot. A slot marked as D is a downlink slot, and a slot marked as U is an uplink slot. In FIG. 2, 203 indicates a time period in which the TDD carrier and the SUL carrier that are sent by the terminal device overlap in terms of time. In the time period, the terminal device sends both the TDD carrier and the SUL carrier. It may be understood that, in an application scenario in which the terminal device uses two or more carriers to perform uplink communication, the terminal device may simultaneously send the TDD carrier and the SUL carrier. Similarly, in an application scenario in which the terminal device uses two or more carriers to perform uplink communication, the terminal device may simultaneously send an FDD carrier and the SUL carrier. When the terminal device simultaneously sends the FDD carrier and the SUL carrier or simultaneously sends the TDD carrier and the SUL carrier, a transmit power of the terminal device may exceed a maximum transmit power of the terminal device. Therefore, it is required to prevent a sum of powers used by the terminal device to transmit two uplink carriers in a same time period from exceeding the maximum transmit power of the terminal device.

A subcarrier spacing of the TDD carrier is the same as or different from a subcarrier spacing of the FDD carrier. In the example in FIG. 2, the subcarrier spacing of the TDD carrier is greater than a subcarrier spacing of the SUL carrier. In other words, a length of a slot corresponding to the TDD carrier is less than a length of a slot corresponding to the SUL carrier. Generally, the subcarrier spacing of the TDD carrier is 30 KHz, and the subcarrier spacing of the SUL carrier is 15 KHz. It should be noted that, the SUL carrier may be a carrier independently used by an NR system, or may be an uplink carrier shared by an NR system and an LTE system.

Figure 3:
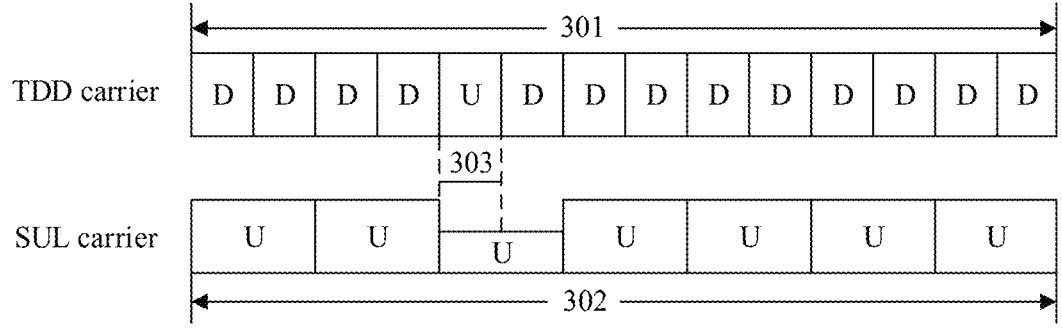
FIG. 3 is a schematic structural diagram of another signal sequence according to this application.

The subcarrier spacing of the TDD carrier or the FDD carrier is usually greater than the subcarrier spacing of the SUL carrier. Therefore, a time period in which the TDD carrier or the FDD carrier overlaps the SUL carrier may not correspond to an integer quantity of time units. The time unit may be a subframe, a slot, a mini-slot, a symbol, or the like. FIG. 3 is a schematic structural diagram of another signal sequence according to this application. As shown in FIG. 3, 301 indicates a time period that corresponds to an uplink signal sent by a terminal device by using a TDD carrier and that corresponds to a downlink signal received by the terminal device by using the TDD carrier; and 302 indicates a time period corresponding to an uplink signal sent by the terminal device by using an SUL carrier. Each rectangle in FIG. 3 corresponds to one slot. A height of each rectangle indicates a transmit power of the terminal device in a slot corresponding to the rectangle. A slot marked as D is a downlink slot, and a slot marked as U is an uplink slot. 303 indicates a time period in which the TDD carrier and the SUL carrier that are sent by the terminal device overlap in terms of time. It can be learned from FIG. 3 that a length of a slot on the SUL carrier is greater than a length of a slot on the TDD carrier, and 303 does not occupy an entire slot on the SUL carrier. As shown in FIG. 3, the terminal device may reduce a transmit power in an entire slot in which overlapping occurs, in other words, reduce a transmit power in the entire slot including 303. For a non-overlapping part in the slot in which overlapping occurs, in other words, a part, other than 303, in the slot including 303, the terminal device may not reduce the transmit power. It may be understood that a different power control manner may be used for the non-overlapping part in the slot in which overlapping occurs. Therefore, it is necessary to further study how to determine the transmit power of the non-overlapping part in the slot in which overlapping occurs, to further improve system performance.

To resolve the foregoing problem, various embodiments propose a new communication method, to ensure that a transmit power of a terminal device does not exceed a maximum transmit power, and improve reliability of uplink transmission.

One inventive principle in accordance with the disclosure may include: when a sum of transmit powers of two pieces of to-be-sent information whose sending times overlap is greater than a maximum transmit power, a terminal device determines priorities of the two pieces of to-be-sent information based on indication information sent by a network device or based on types of carriers that carry the two pieces of to-be-sent information, and reduces a transmit power of information with a lower priority in the two pieces of to-be-sent information, so that a sum of transmit powers of the two pieces of to-be-sent information in a same time period is less than or equal to the maximum transmit power.

The indication information sent by the network device may be used to indicate the priorities of the two pieces of to-be-sent information. In accordance with the disclosure, priorities of information carried on different types of carriers may be different. For example, a priority of information carried on an SUL carrier is higher or lower than a priority of information carried on a TDD carrier. The terminal device may preset a correspondence between a carrier type and a priority. The correspondence between a carrier type and a priority includes a relationship between at least two different types of carriers and at least two priorities. A priority corresponding to a carrier type is a priority of information carried on a carrier belonging to the carrier type. For example, the correspondence between a carrier type and a priority includes a correspondence between the SUL carrier and a first priority and a correspondence between the TDD carrier and a second priority. The terminal device may determine, based on the correspondence, that the priority of the information carried on the SUL carrier is the first priority, and that the priority of the information carried on the TDD carrier is the second priority. In addition, the terminal device may determine, according to a predefined rule, priorities of information carried on various types of carriers. For example, the rule predefined by the terminal device includes that a priority of the SUL carrier is higher than a priority of the TDD carrier.

Figure 4:
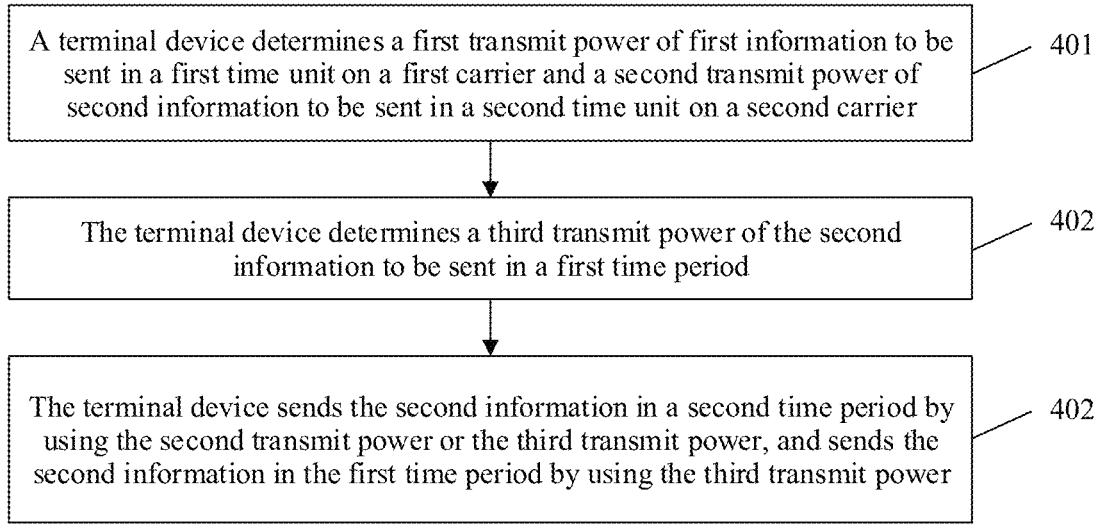
FIG. 4 is a schematic flowchart of a communication method according to this application.

Based on the foregoing main inventive principle, the following describes a communication method provided in this application. As shown in FIG. 4, the method may include the following steps.

401: A terminal device determines a first transmit power of first information to be sent in a first time unit on a first carrier and a second transmit power of second information to be sent in a second time unit on a second carrier.

Figure 5:
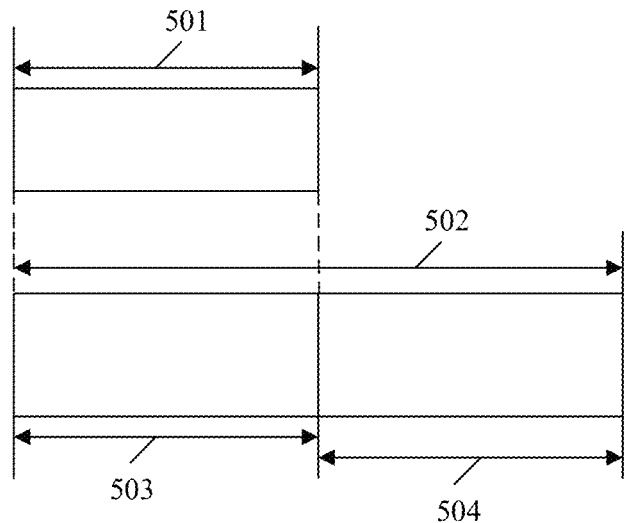
FIG. 5 is a schematic structural diagram of a first time unit and a second time unit according to this application.

The first time unit and the second time unit at least partially overlap, a time period that overlaps the first time unit in the second time unit is a first time period, and a time period that does not overlap the first time unit in the second time unit is a second time period. A time length of the first time unit may be the same as or different from a time length of the second time unit. The first time unit includes any one of a subframe, a slot, a mini-slot, and a symbol; and the second time unit includes any one of a subframe, a slot, a mini-slot, and a symbol. FIG. 5 is a schematic structural diagram of a first time unit and a second time unit according to this application. In FIG. 5, 501 indicates the first time unit, 502 indicates the second time unit, 503 indicates a first time period, and 504 indicates a second time period. The first time period is a time period that overlaps the first time unit in the second time unit, and the second time period is a time period that does not overlap the first time unit in the second time unit. The first carrier is an SUL carrier, and the second carrier is a TDD carrier or an FDD carrier. Alternatively, the first carrier is a TDD carrier or an FDD carrier, and the second carrier is an SUL carrier.

A type of the first information is the same as or different from a type of the second information. The type of the first information may include at least one of uplink data information, uplink control information, and random access information; and the type of the second information may include at least one of uplink data information, uplink control information, and random access information. The type of the first information and the type of the second information are not limited in this application. Optionally, the first information and the second information are information of a same type. For example, both the first information and the second information are the uplink data information. For another example, both the first information and the second information are the uplink control information. In other words, the first information is first uplink control information, and the second information is second uplink control information. For another example, both the first information and the second information are sounding reference signals (SRS). In other words, the first information is a first SRS, and the second information is a second SRS. For another example, both the first information and the second information are the random access information. In some embodiments, the first information and the second information are information of different types. For example, the first information is data information and the second information is the uplink control information. For another example, the first information is the uplink control information, and the second information is second random access information.

Before sending the first information and the second information, the terminal device may determine the first transmit power and the second transmit power by using any power control mechanism. In some embodiments, the terminal device determines the first transmit power and the second transmit power based on measured channel quality.

In one implementation, the first information and the second information are sounding reference signals (SRS) of a same type, the first carrier is the TDD carrier or the FDD carrier, and the second carrier is the SUL carrier, where the type is one of periodic or aperiodic. In other words, for the SRSs of the same type, a priority of an SRS on the TDD carrier or the FDD carrier is higher than a priority of an SRS on the SUL carrier because the SRS on the TDD carrier or the FDD carrier may be used by a network device to send a downlink signal on a downlink carrier corresponding to the TDD carrier or the FDD carrier to perform precoding or beamforming, to improve downlink communication performance. A periodic SRS is an SRS that is cyclically sent according to a specific rule; and an aperiodic SRS is an SRS that is sent in a triggered mode. Alternatively, a periodic SRS may be understood as an SRS that is configured and transmitted by the network device by using higher layer signaling, for example, radio resource control (RRC) layer signaling or media access control (MAC) layer signaling, and an aperiodic SRS may be understood as an SRS that is triggered and transmitted by the network device by using physical layer signaling, for example, downlink control information (DCI).

402: The terminal device determines a third transmit power of the second information to be sent in the first time period.

In an implementation, the determining a third transmit power of the second information to be sent in the first time period includes:

if a sum of the first transmit power and the second transmit power is greater than or equal to a maximum transmit power, determining the third transmit power of the second information to be sent in the first time period, where the third transmit power is less than the second transmit power.

In some embodiments, after determining that the first time unit and the second time unit at least partially overlap, that is, that sending times of the first information and the second information overlap, the terminal device determines the sum of the first transmit power and the second transmit power. The maximum transmit power is a maximum transmit power of the terminal device. It may be understood that, if the sending times of the first information and the second information do not overlap, whether the sum of the first transmit power and the second transmit power is greater than or equal to the maximum transmit power does not need to be determined.

In an implementation, the terminal device may choose to reduce a transmit power of information with a relatively low priority. For example, before the determining a third transmit power of the second information to be sent in the first time period, the method further includes:

determining a priority of the first information and a priority of the second information; and when the priority of the first information is higher than the priority of the second information, determining to reduce a transmit power of the second information.

It may be understood that the second information is information that is determined by the terminal device and that has a lower priority in the first information and the second information. This application provides a plurality of solutions for determining the priority of the first information and the priority of the second information. Example solutions are described in detail in subsequent content.

In this implementation, the terminal device chooses to reduce the transmit power of the information with a relatively low priority. This can be easily implemented, and can ensure transmission reliability of information with a relatively high priority.

403: The terminal device sends the second information in the second time period by using the second transmit power or the third transmit power, and sends the second information in the first time period by using the third transmit power.

The terminal device sends the second information in the first time period by using the third transmit power; and the terminal device sends the second information in the second time period by using the second transmit power, or sends the second information in the second time unit by using the third transmit power. Optionally, the terminal device sends the first information in the first time unit by using the first transmit power.

In this application, the terminal device reduces a transmit power of one of two pieces of information to be sent in a same time period. This can ensure that a transmit power of the terminal device in the time period does not exceed the maximum transmit power, and can be easily implemented.

In an implementation, a specific implementation of determining a transmit power of the second information in the second time period is provided. For example, the sending the second information in the second time period by using the second transmit power or the third transmit power includes:

when a demodulation reference signal is separately included in the first time period and the second time period, sending the second information in the second time period by using the second transmit power; or when a demodulation reference signal is not included in one of the first time period and the second time period, sending the second information in the second time period by using the third transmit power; or when a modulation scheme of the second information is quadrature amplitude modulation, sending the second information in the second time period by using the second transmit power; or when a modulation scheme of the second information is phase shift keying modulation, sending the second information in the second time period by using the third transmit power.

Figure 6:
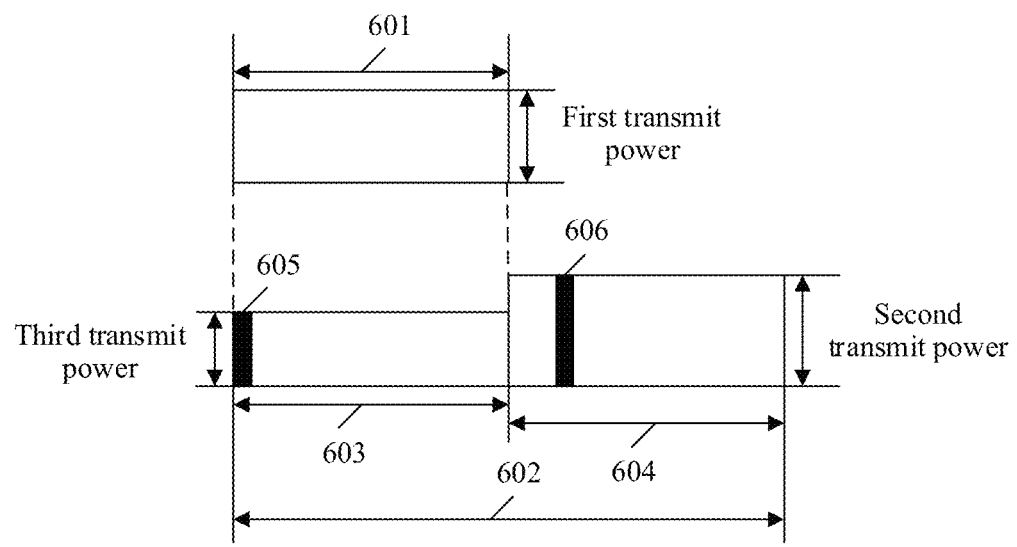
FIG. 6 is a schematic diagram of a power control manner according to this application.

The terminal device may determine, based on whether the demodulation reference signal (DMRS) is included in the first time period and/or the second time period, whether to reduce only a transmit power in the first time period or reduce a transmit power in the entire second time unit. For example, when the demodulation reference signal is separately included in the first time period and the second time period, the second information is sent in the second time period by using the second transmit power. In other words, when the demodulation reference signal is separately included in the first time period and the second time period, only a transmit power of the second information in the first time period is reduced, and the transmit power of the second information in the second time period remains unchanged. The demodulation reference signal is separately included in the first time period and the second time period. Therefore, when the terminal device sends the second information in the first time period and the second time period by using different transmit powers, the network device may determine the transmit power in the first time period by using demodulation reference information included in the first time period, and determine the transmit power in the second time period by using demodulation reference information included in the second time period, to correctly receive the second information. In this manner, the transmit power used by the terminal device to send the second information in the second time period remains unchanged. This can improve reliability of uplink information. FIG. 6 is a schematic diagram of a power control manner according to this application. As shown in FIG. 6, 601 indicates a first time unit, 602 indicates a second time unit, 603 indicates a first time period, 604 indicates a second time period, 605 indicates a DMRS included in 603, and 606 indicates a DMRS included in 604. It can be learned from FIG. 6 that, when the DMRS is separately included in the first time period and the second time period, a transmit power in the first time period is a third transmit power, a transmit power in the second time period is a second transmit power, and a transmit power in the first time unit is a first transmit power.

Figure 7:
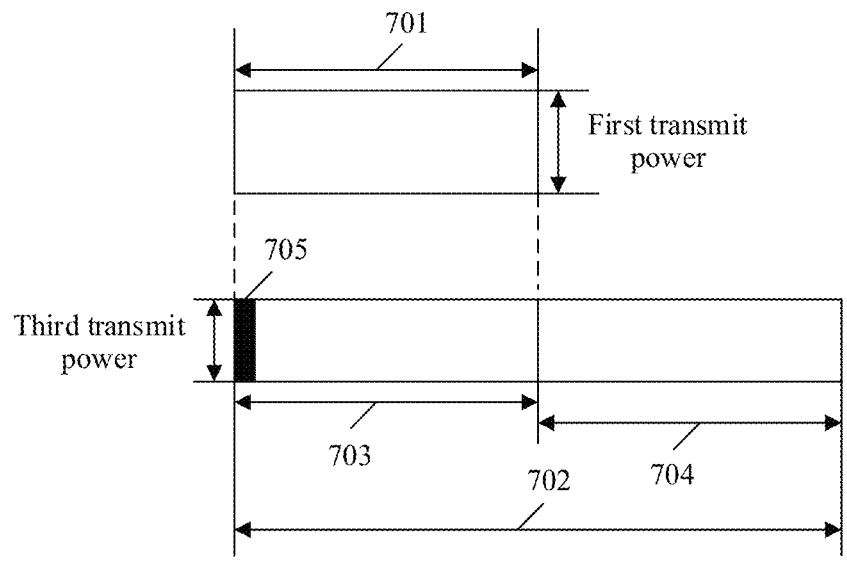
FIG. 7 is a schematic diagram of another power control manner according to this application.

When the demodulation reference signal is not included in one of the first time period and the second time period, the second information is sent in the second time period by using the third transmit power. In other words, when the demodulation reference signal is not included in one of the first time period and the second time period, the second information is sent in the second time unit by using the third transmit power. The demodulation reference signal is not included in one of the first time period and the second time period. Therefore, when the terminal device sends the second information in the first time period and the second time period by using different transmit powers, the network device cannot determine a transmit power in a time period in which the demodulation reference signal is not included. As a result, the network device cannot ensure correct reception of the second information in the second time unit. Therefore, the terminal device needs to ensure that a transmit power used to send the second information in the first time period is consistent with the transmit power used to send the second information in the second time period. FIG. 7 is a schematic diagram of another power control manner according to this application. As shown in FIG. 7, 701 indicates a first time unit, 702 indicates a second time unit, 703 indicates a first time period, 704 indicates a second time period, and 705 indicates a DMRS included in 703. It can be learned from FIG. 7 that, when the DMRS is included in the first time period and no DMRS is included in the second time period, a transmit power in the second time unit is a third transmit power, and a transmit power in the first time unit is a first transmit power.

Figure 8:
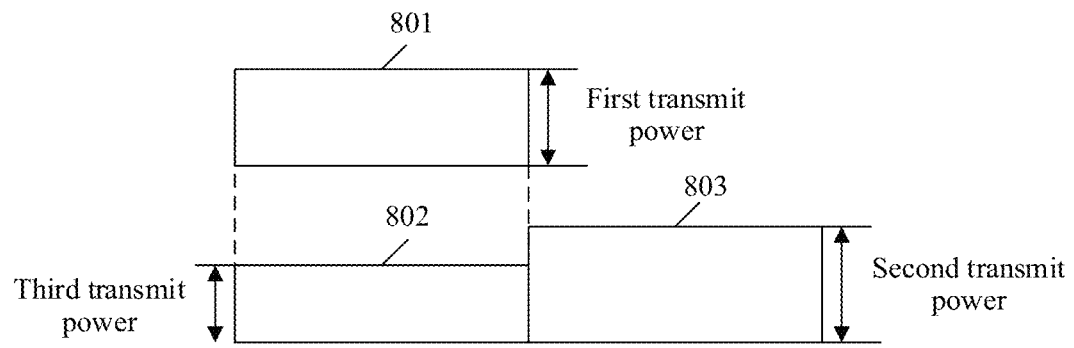
FIG. 8 is a schematic diagram of still another power control manner according to this application.
Figure 9:
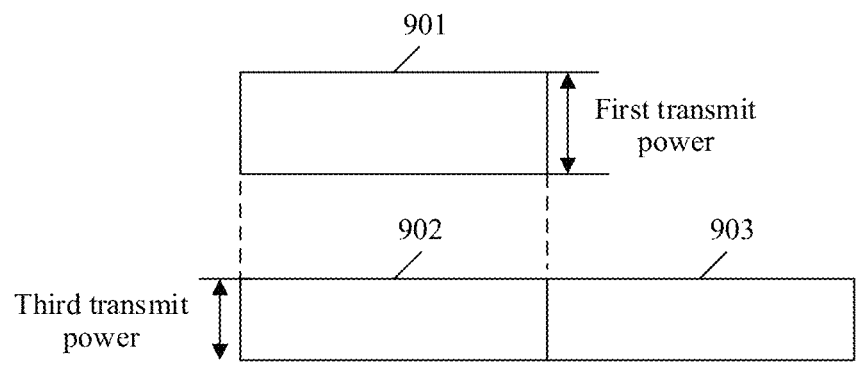
FIG. 9 is a schematic diagram of still another power control manner according to this application.

The quadrature amplitude modulation may include any one of QAM, 4QAM, 16QAM, and 64QAM. The phase shift keying modulation may include any one of quadrature phase shift keying (QPSK), binary phase shift keying BPSK (BPSK), and 8PSK. In accordance with the disclosure, the transmit power of the second information may be determined based on the modulation scheme of the second information. For example, when the modulation scheme of the second information is QPSK, the terminal device determines that the transmit power in the first time period is the third transmit power, and that the transmit power in the second time period is the second transmit power. When QAM modulation is used for the second information, the terminal device may determine that the transmit power in the entire second time unit is the third transmit power. The third transmit power is less than the second transmit power. FIG. 8 is a schematic diagram of another power control manner according to this application. As shown in FIG. 8, 801 indicates first information sent in a first time unit, 802 indicates second information sent in a first time period, and 803 indicates second information sent in a second time period, where a modulation scheme of the second information is QAM. It can be learned from FIG. 8 that a transmit power in the first time period is a third transmit power and a transmit power in the second time period is a second transmit power. FIG. 9 is a schematic diagram of another power control manner according to this application. As shown in FIG. 9, 901 indicates first information sent in a first time unit, 902 indicates second information sent in a first time period, and 903 indicates second information sent in a second time period, where a modulation scheme of the second information is QPSK. It can be learned from FIG. 9 that a transmit power of a terminal device in an entire second time unit is a third transmit power. When the quadrature amplitude modulation is used for the second information, that the terminal device sends the second information in the first time period and the second time period by using different transmit powers can ensure a probability that the network device correctly receives the second information. The power used to send the second information in the second time period is not reduced. This can ensure reliability of the second information. When the phase shift keying modulation is used for the second information, that the terminal device sends the second information in the first time period and the second time period by using different transmit powers cannot ensure a probability that the network device correctly receives the second information. Therefore, it needs to be ensured that a transmit power of the terminal device in the second time unit remains unchanged.

In the foregoing solution, the terminal device may use an adaptive power control method for different cases. This can ensure that the network device determines a transmit power of the terminal device in each time period, and further improve reliability of uplink transmission of the terminal device.

In an implementation, another specific implementation of determining a transmit power of the second information in the second time period is provided. For example, the sending the second information in the second time period by using the second transmit power or the third transmit power includes:

when a demodulation reference signal is separately included in the first time period and the second time period, and/or a modulation scheme corresponding to the second information is phase shift keying modulation, sending the second information in the second time period by using the second transmit power; or when a demodulation reference signal is not included in one of the first time period and the second time period, and a modulation scheme of the second information is quadrature amplitude modulation, sending the second information in the second time period by using the third transmit power.

When the demodulation reference signal is separately included in the first time period and the second time period, and/or the modulation scheme corresponding to the second information is the phase shift keying modulation, a probability that the network device correctly receives the second information can also be ensured when the terminal device sends the second information in the first time period and the second time period by using different transmit powers. Therefore, a transmit power of the terminal device in the second time period may remain unchanged. When the demodulation reference signal is not included in one of the first time period and the second time period, and the modulation scheme of the second information is the quadrature amplitude modulation, a probability that the network device correctly receives the second information cannot be ensured when the terminal device sends the second information in the first time period and the second time period by using different transmit powers. Therefore, it needs to be ensured that a transmit power of the terminal device in the second time unit is the third transmit power.

In the foregoing solution, the terminal device may use an adaptive power control method for different cases. This can ensure that the network device determines a transmit power of the terminal device in each time period, and further improve reliability of uplink transmission of the terminal device.

Figure 10:
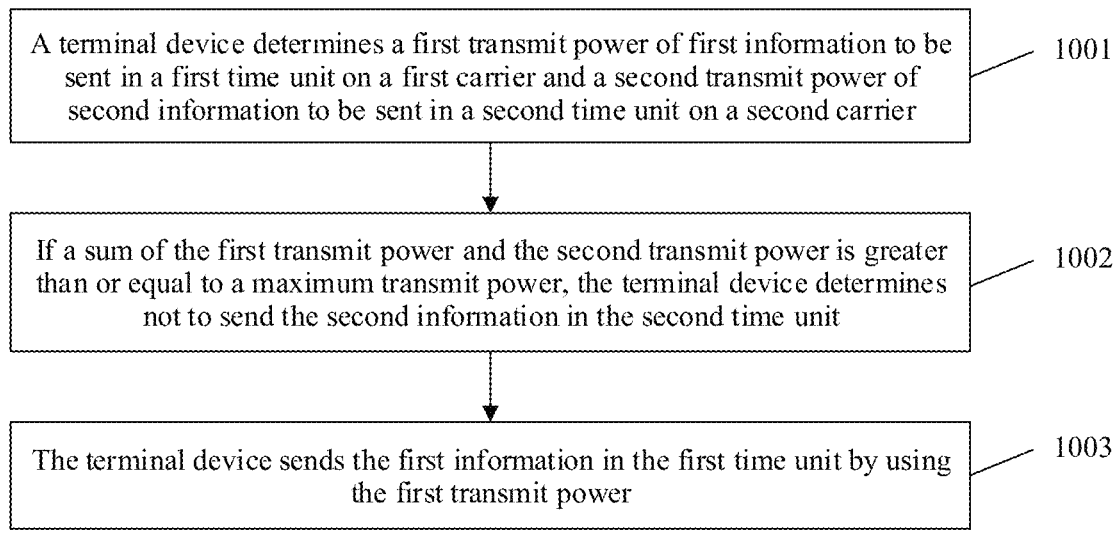
FIG. 10 is a schematic flowchart of another communication method according to this application.

Based on the foregoing main inventive principle, the following describes another communication method provided in this application. As shown in FIG. 10, the method may include the following steps.

1001: A terminal device determines a first transmit power of first information to be sent in a first time unit on a first carrier and a second transmit power of second information to be sent in a second time unit on a second carrier.

The first time unit and the second time unit at least partially overlap, a time period that overlaps the first time unit in the second time unit is a first time period, and a time period that does not overlap the first time unit in the second time unit is a second time period.

1002: If a sum of the first transmit power and the second transmit power is greater than or equal to a maximum transmit power, the terminal device determines not to send the second information in the second time unit.

In some embodiments, after determining that the first time unit and the second time unit at least partially overlap, the terminal device determines whether the sum of the first transmit power and the second transmit power is greater than or equal to the maximum transmit power. That the terminal device determines not to send the second information in the second time unit may be: the terminal device determines that a third transmit power of the second information to be sent in the first time period is 0. The second information is information that is determined by the terminal device and that has a lower priority in the first information and the second information. Optionally, the second information is information that has a lower latency requirement in the first information and the second information. In other words, the second information is information that is determined by the terminal device and that needs to be preferentially sent in the first information and the second information.

In an implementation, the terminal device may adjust a time period for sending the second information. For example, that the terminal device determines not to send the second information in the second time unit includes:

the terminal device determines to send the second information in a third time unit on the second carrier.

The third time unit does not overlap the first time unit, and is located after the first time unit. If the sum of the first transmit power and the second transmit power is greater than or equal to the maximum transmit power, the terminal device determines to send the second information in the third time unit on the second carrier. Optionally, the terminal device sends the second information in the third time unit on the second carrier. In other words, the terminal device may send the second information after sending the first information. A power used by the terminal device to send the second information in the third time unit may be the second transmit power, or may be a target transmit power. The target transmit power is a power determined by the terminal device to send the second information in the third time unit.

1003: The terminal device sends the first information in the first time unit by using the first transmit power.

In this application, sending times of two pieces of to-be-sent information of the terminal device do not overlap. This can effectively prevent a transmit power of the terminal device from exceeding a maximum transmit power of the terminal device.

In the communication methods in FIG. 4 and FIG. 10, one piece of information whose transmit power needs to be adjusted needs to be determined in two pieces of to-be-sent information. In this application, the terminal device may determine to adjust a transmit power of information with a lower priority in the two pieces of to-be-sent information. It may be understood that the second information is the information that is determined by the terminal device and that has the lower priority in the first information and the second information. The following describes solutions provided in this application for determining priorities of the two pieces of to-be-sent information.

Solution 1

A priority of the first information and a priority of the second information are determined according to a predefined rule. For example, when it is determined, according to the predefined rule, that the priority of the first information is higher than the priority of the second information, the third transmit power of the second information to be sent in the first time period is determined.

The predefined rule may include any one of the following: (1) a priority of information carried on an SUL carrier is higher than a priority of information carried on a TDD carrier or an FDD carrier; (2) a priority of information carried on an SUL carrier is lower than a priority of information carried on a TDD carrier or an FDD carrier; (3) a priority of information carried on a carrier with a relatively small subcarrier spacing is higher than a priority of information carried on a carrier with a relatively large subcarrier spacing; and (4) a priority of information carried on a carrier with a relatively small subcarrier spacing is lower than a priority of information carried on a carrier with a relatively large subcarrier spacing. The predefined rule may further include another rule for determining the priorities of the two pieces of to-be-sent information.

Because a frequency of the SUL carrier is usually lower than a frequency of the TDD carrier, a channel condition of the SUL carrier is usually better than a channel condition of the TDD carrier. Therefore, the priority of the information carried on the SUL carrier is defined to be higher than the priority of the information carried on the TDD carrier, so that reliability of the information sent by using the SUL carrier can be improved. On the contrary, the priority of the information carried on the SUL carrier is defined to be lower than the priority of the information carried on the TDD carrier, so that a probability that both the information carried on the SUL carrier and the information carried on the TDD carrier are accurately received can be increased. The information carried on the carrier with the relatively small subcarrier spacing has a longer cyclic prefix than the information carried on the carrier with the relatively large subcarrier spacing. This can adapt to a channel with a larger time spread, and improve reliability of uplink transmission. Therefore, the priority of the information carried on the carrier with the relatively small subcarrier spacing is defined to be higher, so that reliability of uplink transmission can be improved. On the contrary, the priority of the information carried on the carrier with the relatively small subcarrier spacing is defined to be lower, so that validity of uplink transmission can be improved. In this application, the terminal device may select, based on a requirement of an application scenario, a predefined rule to be used. In other words, in different application scenarios, the terminal device may determine the priorities of the two pieces of to-be-sent information by using different rules. For example, in a first application scenario, a rule used by the terminal device is that the priority of the information carried on the carrier with the relatively small subcarrier spacing is higher than the priority of the information carried on the carrier with the relatively large subcarrier spacing. In a second application scenario, a rule used by the terminal device is that the priority of the information carried on the carrier with the relatively small subcarrier spacing is lower than the priority of the information carried on the carrier with the relatively large subcarrier spacing.

In this solution, the terminal device can determine the priorities of the two pieces of to-be-sent information, requiring no additional signaling notification. This can reduce overheads of downlink signaling and can be easily implemented.

Solution 2

A priority of the first information and a priority of the second information are determined based on a correspondence between a carrier type and a priority. For example:

The terminal device determines the priority of the first information and the priority of the second information based on the correspondence between a carrier type and a priority; and when determining that the priority of the first information is higher than the priority of the second information, determines the third transmit power of the second information to be sent in the first time period.

The terminal device may preset the correspondence between a carrier type and a priority. The correspondence between a carrier type and a priority includes a relationship between at least two different types of carriers and at least two priorities. A priority corresponding to a carrier type is a priority of information carried on a carrier belonging to the carrier type. For example, the correspondence between a carrier type and a priority includes a correspondence between an SUL carrier and a first priority and a correspondence between a TDD carrier and a second priority. The terminal device may determine, based on the correspondence, that a priority of information carried on the SUL carrier is the first priority, and that a priority of information carried on the TDD carrier is the second priority. It is assumed that the terminal device determines, based on the correspondence between a carrier type and a priority, that the first carrier corresponds to the first priority and the second carrier corresponds to the second priority. The priority of the first information is the first priority, and the priority of the second information is the second priority. The first information is information carried on the first carrier, and the second information is information carried on the second carrier.

TABLE 1

| Carrier type | Priority |
| --- | --- |
| First carrier type | First priority |
| Second carrier type | Second priority |
| Third carrier type | Third priority |

For example, the terminal device may preset a table of the correspondence between a carrier type and a priority, and the table of the correspondence includes the correspondence between a carrier type and a priority. It can be learned from Table 1 that, different carrier types correspond to different priorities, and each carrier type corresponds to one type of carrier. For example, the first carrier type corresponds to the first priority, and the second carrier type corresponds to the second priority. In actual application, the terminal device may determine, based on the table of the correspondence between a carrier type and a priority, a priority of information carried on any one carrier. In this application, carrier types are classified in different manners. In this application, uplink carriers may be classified into SUL carriers, TDD carriers, and FDD carriers, or may be classified into SUL carriers and non-SUL carriers, in other words, carriers other than the SUL carriers. In this application, carrier types may alternatively be classified based on a subcarrier spacing of a carrier or in another manner. The following is a specific example, provided in this application, of determining the priorities of the two pieces of to-be-sent information based on the correspondence between a carrier type and a priority.

(1) A first carrier type of the first carrier is determined, and a priority corresponding to the first carrier type is determined based on the correspondence between a carrier type and a priority, where the priority of the first carrier type is the priority of the first information carried on the first carrier.

(2) A second carrier type of the second carrier is determined, and a priority corresponding to the second carrier type is determined based on the correspondence between a carrier type and a priority, where the priority of the second carrier type is the priority of the second information carried on the second carrier.

(3) An order of the priority of the first information and the priority of the second information is determined.

In this solution, a priority of information carried on a carrier is determined based on a type of the carrier. This uses a feature that different types of carriers have different transmission properties, and can further improve transmission performance.

Solution 3

The terminal device determines the priorities of the two pieces of to-be-sent information based on indication information sent by a network device. In an implementation, a method for determining the priorities of the two pieces of to-be-sent information based on the indication information sent by the network device is provided. For example, the foregoing method further includes:

receiving the indication information from the network device, where the indication information is used to indicate that a priority of the first carrier is higher than a priority of the second carrier, where the first carrier is a supplementary uplink SUL carrier, and the second carrier is a time division duplex TDD carrier or a frequency division duplex FDD carrier; or the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or a subcarrier spacing of the first carrier is greater than a subcarrier spacing of the second carrier; and the determining a third transmit power of the second information to be sent in the first time period includes:

when determining, based on the indication information, that a priority of the first information is higher than a priority of the second information, determining the third transmit power of the second information to be sent in the first time period.

The indication information is used to indicate that a priority of information carried on the SUL carrier is higher than a priority of information carried on the TDD carrier and/or the FDD carrier. Alternatively, the indication information is used to indicate that a priority of information carried on a carrier with a relatively small subcarrier spacing is higher than a priority of information carried on a carrier with a relatively large subcarrier spacing. Alternatively, the indication information is used to indicate that a priority of information carried on the SUL carrier is lower than a priority of information carried on the TDD carrier and/or the FDD carrier. Alternatively, the indication information is used to indicate that a priority of information carried on a carrier with a relatively small subcarrier spacing is lower than a priority of information carried on a carrier with a relatively large subcarrier spacing.

Optionally, the network device may send the indication information to the terminal device by using higher layer signaling. In other words, the terminal device may receive, from the network device, the higher layer signaling that carries the indication information. The higher layer signaling may be radio resource control (Radio Resource Control, RRC) layer signaling, or may be media access control (Media Access Control, MAC) layer signaling.

The network device may send the indication information to the terminal device by using physical layer signaling. In other words, the terminal device may receive, from the network device, the physical layer signaling that carries the indication information. The physical layer signaling may be downlink control information. For example, the terminal device receives first downlink control information from the network device in a third time unit, where the first downlink control information is used to indicate the terminal device to send the first information to the network device in a first time unit on a first uplink carrier; and receives second downlink control information from the network device in a fourth time unit, where the second control information is used to indicate the terminal device to send the second information to the network device in a second time unit on a second uplink carrier. The first downlink control information and/or the second downlink control information carries the indication information. The indication information may be carried in downlink control information that is earlier in terms of time. If the third time unit is earlier than the fourth time unit in terms of time, the first downlink control information carries the indication information and the second downlink control information does not carry the indication information. The indication information may be carried in downlink control information that is later in terms of time. If the third time unit is earlier than the fourth time unit in terms of time, the second downlink control information carries the indication information and the first downlink control information does not carry the indication information.

The network device may send different indication information to the terminal device based on different application scenarios. In other words, a manner in which the terminal device determines a priority of to-be-sent information is not fixed, and may be adjusted based on the indication information sent by the network device. For example, the terminal device determines, based on first indication information sent by the network device, that the priority of the first information is higher than the priority of the second information, or determines, based on second indication information sent by the network device, that the priority of the first information is lower than the priority of the second information.

In this solution, the terminal device determines the priorities of the two pieces of to-be-sent information based on the indication information sent by the network device. This is highly flexible, and can meet requirements of different scenarios.

Solution 4

(1) The terminal device receives first control information and second control information from a network device.

The first control information is used to indicate a priority of the first information, and the second control information is used to indicate a priority of the second information. Optionally, the first control information is further used to indicate the terminal device to send the first information in the first time unit on the first carrier. The second control information is further used to indicate the terminal device to send the second information in the second time unit on the second carrier. The terminal device determines, based on the first control information, the first transmit power of the first information to be sent in the first time unit on the first carrier, and determines, based on the second control information, the second transmit power of the second information to be sent in the second time unit on the second carrier.

In some embodiments, the first control information includes a first field, and the first field indicates the priority of the first information; and the second downlink control information includes a second field, and the second field indicates the priority of the second information. The first field may occupy one bit of the first control information. When a value of the one bit is 0, it indicates that a priority of uplink information scheduled by using the first control information is relatively low; or when a value of the one bit is 1, it indicates that a priority of uplink information scheduled by using the first control information is relatively high. Optionally, when a value of the one bit is 1, it indicates that a priority of uplink information scheduled by using the first control information is relatively low; or when a value of the one bit is 0, it indicates that a priority of uplink information scheduled by using the first control information is relatively high. In addition, the first field may alternatively occupy a plurality of bits of the first control information. For example, the first field may occupy two bits. When a value of the two bits is 11, it indicates that a priority of uplink information scheduled by using the first control information is relatively high; or when a value of the two bits is 00, it indicates that a priority of uplink information scheduled by using the first control information is relatively low. The second control information may indicate the priority of the second information in a same manner.

In some embodiments, a first mask indicates the priority of the first information, and the first mask is a cyclic redundancy check mask in the first control information; and a second mask indicates the priority of the second information, and the second mask is a cyclic redundancy check mask in the second control information. The terminal device determines the priority of the first information based on the first mask, and determines the priority of the second information based on the second mask. The first mask and the second mask indicate different priorities. In actual application, the terminal device may obtain, by parsing control information from the network device, a mask corresponding to the control information, and determine, based on the mask, a priority of uplink information scheduled by using the control information. For example, when a CRC length is 24 bits, the first mask and the second mask may be shown in Table 2 below. When the CRC length is 16 bits, the first mask and the second mask may be shown in Table 3 below. The CRC length may alternatively be another value, for example, 32 bits. This is not limited herein. It should be noted that, although in Table 2 and Table 3, the first mask is all 0s and the second mask is all 1s, it may be understood that the first mask may also be all 1s and the second mask may also be all 0s. Certainly, the first mask and the second mask may alternatively be other masks that are not all 1s. This is not limited herein.

TABLE 2

| Mask type | CRC mask |
|---|---|
| First mask | <0, 0, 0, 0, 0, 0, 0, 0, 0, 0, 0, 0, 0, 0, 0, 0, 0, 0, 0, 0, 0, 0, 0, 0> |
| First mask | <1, 1, 1, 1, 1, 1, 1, 1, 1, 1, 1, 1, 1, 1, 1, 1, 1, 1, 1, 1, 1, 1, 1, 1> |

TABLE 3

| Mask type | CRC mask |
|---|---|
| First mask | <0, 0, 0, 0, 0, 0, 0, 0, 0, 0, 0, 0, 0, 0, 0, 0> |
| First mask | <1, 1, 1, 1, 1, 1, 1, 1, 1, 1, 1, 1, 1, 1, 1, 1> |

(2) The priority of the first information is determined based on the first control information, and the priority of the second information is determined based on the second control information.

In this solution, the terminal device determines the priorities of the two pieces of to-be-sent information based on the control information sent by the network device. This is highly flexible and real-time.

Figure 11:
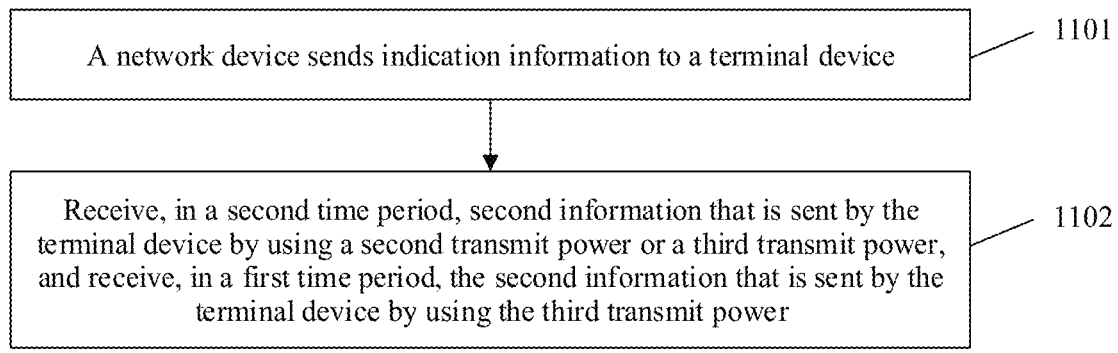
FIG. 11 is a schematic flowchart of still another communication method according to this application.

This application provides another communication method. As shown in FIG. 11, the method may include the following steps.

1101: A network device sends indication information to a terminal device.

The indication information is used to indicate a priority of first information and a priority of second information. The first information is information to be sent by the terminal device in a first time unit on a first carrier by using a first transmit power, and the second information is information to be sent by the terminal device in a second time unit on a second carrier by using a second transmit power. The first time unit and the second time unit at least partially overlap, a time period that overlaps the first time unit in the second time unit is a first time period, and a time period that does not overlap the first time unit in the second time unit is a second time period. The terminal device may determine the priority of the first information and the priority of the second information based on the indication information.

In an implementation, the indication information is used to indicate that a priority of the first carrier is higher than a priority of the second carrier, where the first carrier is a supplementary uplink SUL carrier, and the second carrier is a time division duplex TDD carrier or a frequency division duplex FDD carrier; or the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or a subcarrier spacing of the first carrier is greater than a subcarrier spacing of the second carrier.

The terminal device may determine the priority of the first information and the priority of the second information based on the indication information. An order of the priority of the first carrier and the priority of the second carrier is consistent with an order of the priority of the first information and the priority of the second information. If the priority of the first carrier is higher than the priority of the second carrier, the priority of the first information is higher than the priority of the second information. If the priority of the first carrier is lower than the priority of the second carrier, the priority of the first information is lower than the priority of the second information. Therefore, the terminal device may determine the priority of the first information and the priority of the second information based on the priority of the first carrier and the priority of the second carrier.

The network device may send different indication information to the terminal device based on different application scenarios. For example, in a first application scenario, first indication information sent by the network device indicates that the priority of the first carrier is higher than the priority of the second carrier. In a second application scenario, second indication information sent by the network device indicates that the priority of the second carrier is higher than the priority of the first carrier.

In accordance with the disclosure, the terminal device determines priorities of two pieces of to-be-sent information based on the indication information sent by the network device. This is highly flexible, and can meet requirements of different scenarios.

In an implementation, the sending, by a network device, indication information to a terminal device includes:

sending first control information and second control information to the terminal device, where the first control information is used to indicate the priority of the first information; the second control information is used to indicate the priority of the second information; the first control information includes a first field, and the first field indicates the priority of the first information; and the second downlink control information includes a second field, and the second field indicates the priority of the second information; or a first mask indicates the priority of the first information, and the first mask is a cyclic redundancy check mask in the first control information; and a second mask indicates the priority of the second information, and the second mask is a cyclic redundancy check mask in the second control information.

Optionally, the first control information is further used to indicate the terminal device to send the first information in the first time unit on the first carrier. The second control information is further used to indicate the terminal device to send the second information in the second time unit on the second carrier. The terminal device determines, based on the first control information, the first transmit power of the first information to be sent in the first time unit on the first carrier, and determines, based on the second control information, the second transmit power of the second information to be sent in the second time unit on the second carrier.

In this solution, the terminal device determines priorities of two pieces of to-be-sent information based on the control information sent by the network device. This is highly flexible and real-time.

1102: The terminal device receives, in the second time period, the second information that is sent by the terminal device by using the second transmit power or a third transmit power, and receives, in the first time period, the second information that is sent by the terminal device by using the third transmit power.

The third transmit power is less than the second transmit power.

In this application, the network device indicates, by using the sent indication information, the priorities of the first information and the second information that are to be sent by the terminal device. In this way, when determining that a sum of transmit powers of the first information and the second information is greater than or equal to a maximum transmit power of the terminal device, the terminal device reduces a transmit power of information with a lower priority. This is highly flexible.

Figure 12:
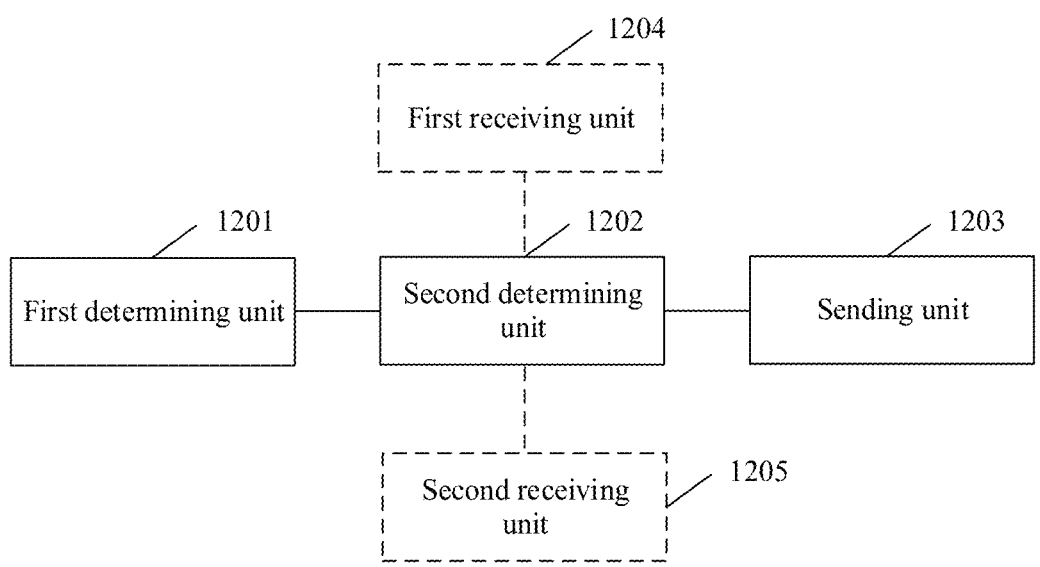
FIG. 12 is a schematic structural diagram of a terminal device according to this application.

This application provides a terminal device. As shown in FIG. 12, the terminal device includes:

a first determining unit 1201, configured to determine a first transmit power of first information to be sent in a first time unit on a first carrier and a second transmit power of second information to be sent in a second time unit on a second carrier, where the first time unit and the second time unit at least partially overlap, a time period that overlaps the first time unit in the second time unit is a first time period, and a time period that does not overlap the first time unit in the second time unit is a second time period;

a second determining unit 1202, configured to determine a third transmit power of the second information to be sent in the first time period; and a sending unit 1203, configured to: send the second information in the second time period by using the second transmit power or the third transmit power, and send the second information in the first time period by using the third transmit power.

An example implementation method is the same as the method in FIG. 4, and details are not described herein again.

In an implementation, the second determining unit is For example configured to: if a sum of the first transmit power and the second transmit power is greater than or equal to a maximum transmit power, determine the third transmit power of the second information to be sent in the first time period, where the third transmit power is less than the second transmit power.

In an implementation, the first carrier is a supplementary uplink SUL carrier, and the second carrier is a time division duplex TDD carrier or a frequency division duplex FDD carrier; or a subcarrier spacing of the first carrier is less than a subcarrier spacing of the second carrier.

In an implementation, the terminal device further includes:

a first receiving unit 1204, configured to receive indication information from a network device, where the indication information is used to indicate that a priority of the first carrier is higher than a priority of the second carrier, where the first carrier is a supplementary uplink SUL carrier, and the second carrier is a time division duplex TDD carrier or a frequency division duplex FDD carrier; or the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or a subcarrier spacing of the first carrier is greater than a subcarrier spacing of the second carrier; and the second determining unit 1202 is For example configured to: when determining, based on the indication information, that a priority of the first information is higher than a priority of the second information, determine the third transmit power of the second information to be sent in the first time period.

In an implementation, the first information and the second information are sounding reference signals SRSs of a same type, the first carrier is a TDD carrier or an FDD carrier, and the second carrier is an SUL carrier, where the type is one of periodic or aperiodic.

In an implementation, the terminal device further includes:

a second receiving unit 1205, configured to receive first control information and second control information from a network device, where the first control information is used to indicate a priority of the first information, and the second control information is used to indicate a priority of the second information; and the second determining unit 1202 is For example configured to: when determining, based on the first control information and the second control information, that the priority of the first information is higher than the priority of the second information, determine the third transmit power of the second information to be sent in the first time period.

In an implementation, the first control information includes a first field, and the first field indicates the priority of the first information; and the second downlink control information includes a second field, and the second field indicates the priority of the second information; or a first mask indicates the priority of the first information, and the first mask is a cyclic redundancy check mask in the first control information; and a second mask indicates the priority of the second information, and the second mask is a cyclic redundancy check mask in the second control information.

In an implementation, the sending unit is For example configured to: when a demodulation reference signal is separately included in the first time period and the second time period, send the second information in the second time period by using the second transmit power; or when a demodulation reference signal is not included in one of the first time period and the second time period, send the second information in the second time period by using the third transmit power; or when a modulation scheme of the second information is quadrature amplitude modulation, send the second information in the second time period by using the second transmit power; or when a modulation scheme corresponding to the second information is phase shift keying modulation, send the second information in the second time period by using the third transmit power.

In an implementation, the sending unit is For example configured to: when a demodulation reference signal is separately included in the first time period and the second time period, and/or a modulation scheme corresponding to the second information is phase shift keying modulation, send the second information in the second time period by using the second transmit power; or when a demodulation reference signal is not included in one of the first time period and the second time period, and a modulation scheme of the second information is quadrature amplitude modulation, send the second information in the second time period by using the third transmit power.

Figure 13:
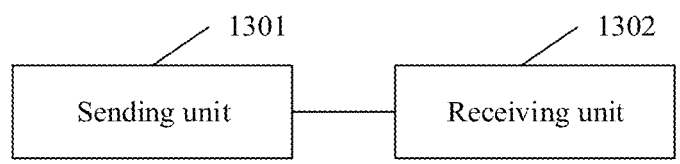
FIG. 13 is a schematic structural diagram of a network device according to this application.

This application provides a network device. As shown in FIG. 13, the network device may include:

a sending unit 1301, configured to send indication information to a terminal device, where the indication information is used to indicate a priority of first information and a priority of second information, the first information is information to be sent by the terminal device in a first time unit on a first carrier by using a first transmit power, the second information is information to be sent by the terminal device in a second time unit on a second carrier by using a second transmit power, the first time unit and the second time unit at least partially overlap, a time period that overlaps the first time unit in the second time unit is a first time period, and a time period that does not overlap the first time unit in the second time unit is a second time period; and a receiving unit 1302, configured to: receive, in the second time period, the second information that is sent by the terminal device by using the second transmit power or a third transmit power, and receive, in the first time period, the second information that is sent by the terminal device by using the third transmit power, where the third transmit power is less than the second transmit power.

An example implementation method is the same as the method in FIG. 11, and details are not described herein again.

In an implementation, the indication information is used to indicate that a priority of the first carrier is higher than a priority of the second carrier, where the first carrier is a supplementary uplink SUL carrier, and the second carrier is a time division duplex TDD carrier or a frequency division duplex FDD carrier; or the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or a subcarrier spacing of the first carrier is greater than a subcarrier spacing of the second carrier.

In an implementation, the sending unit 1301 is For example configured to send first control information and second control information to the terminal device, where the first control information is used to indicate the priority of the first information; the second control information is used to indicate the priority of the second information; the first control information includes a first field, and the first field indicates the priority of the first information; and the second downlink control information includes a second field, and the second field indicates the priority of the second information; or a first mask indicates the priority of the first information, and the first mask is a cyclic redundancy check mask in the first control information; and a second mask indicates the priority of the second information, and the second mask is a cyclic redundancy check mask in the second control information.

Figure 14:
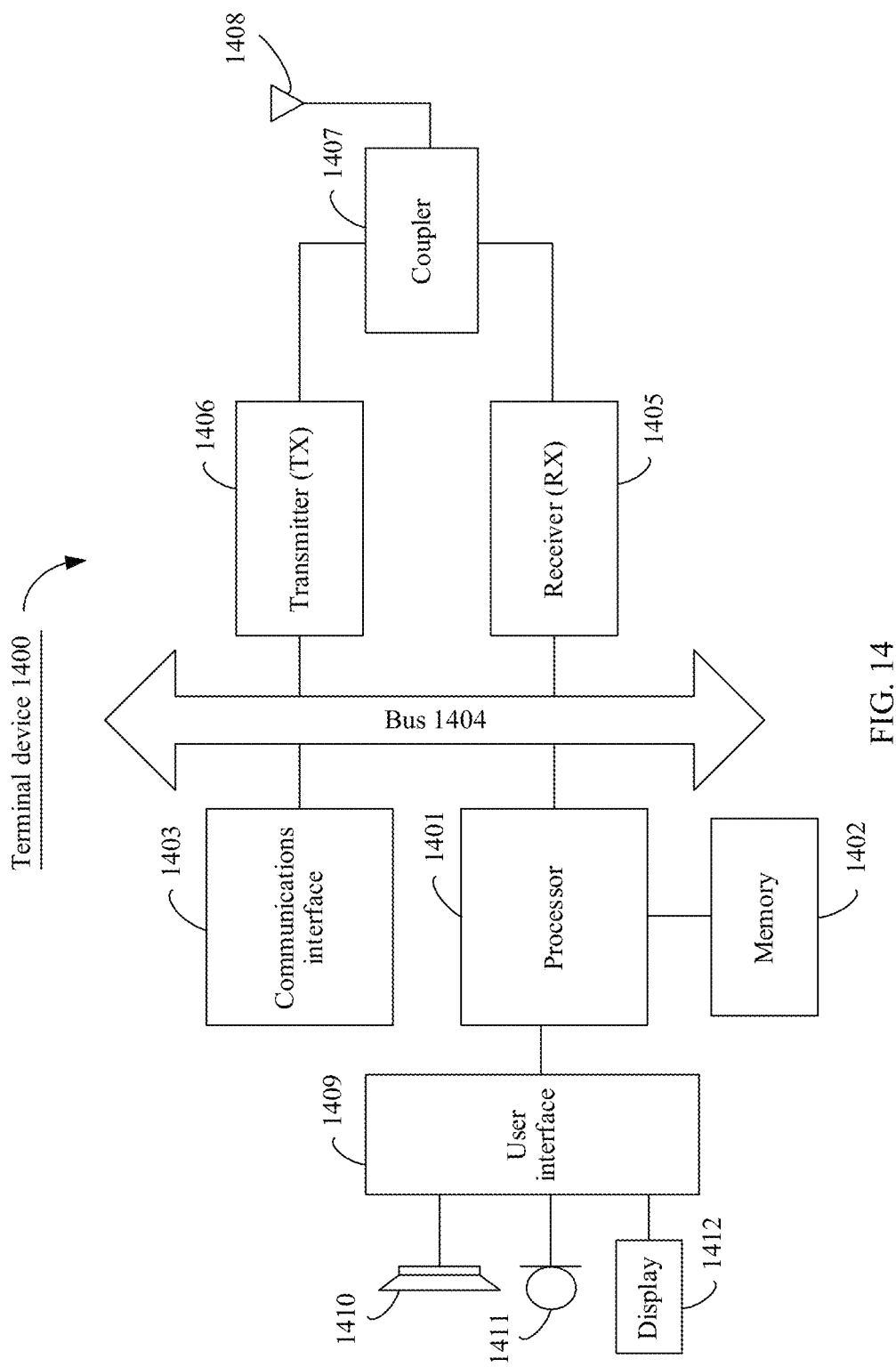
FIG. 14 is a schematic structural diagram of another terminal device according to this application.

FIG. 14 shows a terminal device 1400 according to some embodiments of this application. As shown in FIG. 14, the terminal device 1400 may include: one or more terminal device processors 1401, a memory 1402, a communications interface 1403, a receiver 1405, a transmitter 1406, a coupler 1407, an antenna 1408, a user interface 1402, and an input and output module (including an audio input and output module 1410, a key input module 1411, a display 1412, and the like). These components may be connected through a bus 1404 or in another manner. In FIG. 14, an example in which the components are connected through the bus is used.

The communications interface 1403 may be used by the terminal device 1400 for communicating with another communications device, for example, a network device. For example, the network device may be a network device 1500 shown in FIG. 15. For example, the communications interface 1403 may be a long term evolution (LTE) (4G) communications interface, or may be a 5G communications interface or a future new radio communications interface. In addition to a wireless communications interface, the terminal device 1400 may further have a wired communications interface 1403, for example, a local access network (Local Access Network, LAN) interface.

The transmitter 1406 may be configured to perform transmission processing, for example, signal modulation, on a signal output by the terminal device processor 1401. The receiver 1405 may be configured to perform reception processing, for example, signal demodulation, on a mobile communication signal received by the antenna 1408. In some embodiments of this application, the transmitter 1406 and the receiver 1405 may be considered as a wireless modem. The terminal device 1400 may include one or more transmitters 1406 and one or more receivers 1405. The antenna 1408 may be configured to convert electromagnetic energy in a transmission line into an electromagnetic wave in free space, or convert an electromagnetic wave in free space into electromagnetic energy in a transmission line. The coupler 1407 is configured to split the mobile communication signal received by the antenna 1408 into a plurality of signals, and allocate the plurality of signals to the plurality of receivers 1405. The receiver 1405 may be configured to implement functions of the first receiving unit 1204 and the second receiving unit 1205. The transmitter 1406 may be configured to implement a function of the sending unit 1203.

In addition to the transmitter 1406 and the receiver 1405 shown in FIG. 14, the terminal device 1400 may further include another communications component, for example, a GPS module, a Bluetooth module, or a wireless fidelity (Wi-Fi) module. In addition to the foregoing wireless communication signal, the terminal device 1400 may further support another wireless communication signal, for example, a satellite signal or a short-wave signal. In addition to supporting wireless communication, the terminal device 1400 may further have a wired network interface (a LAN interface) to support wired communication.

The input and output module may be configured to implement interaction between the terminal device 1400 and a user/an external environment, and may mainly include the audio input and output module 1410, the key input module 1411, the display 1412, and the like. For example, the input and output module may further include a camera, a touchscreen, a sensor, and the like. All the input and output modules communicate with the terminal device processor 1401 through the user interface 1409.

The memory 1402 is coupled to the terminal device processor 1401, and is configured to store various software programs and/or a plurality of groups of instructions. For example, the memory 1402 may include a high-speed random access memory, and may also include a nonvolatile memory, for example, one or more magnetic disk storage devices, a flash memory device, or another nonvolatile solid-state storage device. The memory 1402 may store an operating system (which is referred to as a system below), for example, an embedded operating system such as Android, iOS, Windows, or Linux. The memory 1402 may further store a network communications program. The network communications program may be used for communicating with one or more additional devices, one or more terminal devices, or one or more network devices. The memory 1402 may further store a user interface program. The user interface program may vividly display content of an application program by using a graphical operation interface, and receive, by using an input control such as a menu, a dialog box, or a key, a control operation performed by the user on the application program.

In some embodiments of this application, the memory 1402 may be configured to store a program for implementing, on a terminal device 1400 side, the communication method provided in one or more embodiments of this application. For implementation of the communication method provided in the one or more embodiments of this application, refer to the following embodiments.

The terminal device processor 1401 may be configured to read and execute a computer readable instruction. For example, the terminal device processor 1401 may be configured to invoke a program stored in the memory 1412, for example, the program for implementing, on the terminal device 1400 side, the communication method provided in the one or more embodiments of this application, and execute an instruction included in the program. The processor 1401 may implement functions of the first determining unit 1201 and the second determining unit 1203.

It may be understood that the terminal device 1400 may be the terminal device 103 in the wireless communications system 100 shown in FIG. 1, and may be implemented as a mobile device, a mobile station, a mobile unit, a radio unit, a remote unit, a user agent, a mobile client, or the like.

It should be noted that the terminal device 1400 shown in FIG. 14 is merely an implementation of the embodiments of this application, and in actual application, the terminal device 1400 may further include more or fewer components. This is not limited herein.

Figure 15:
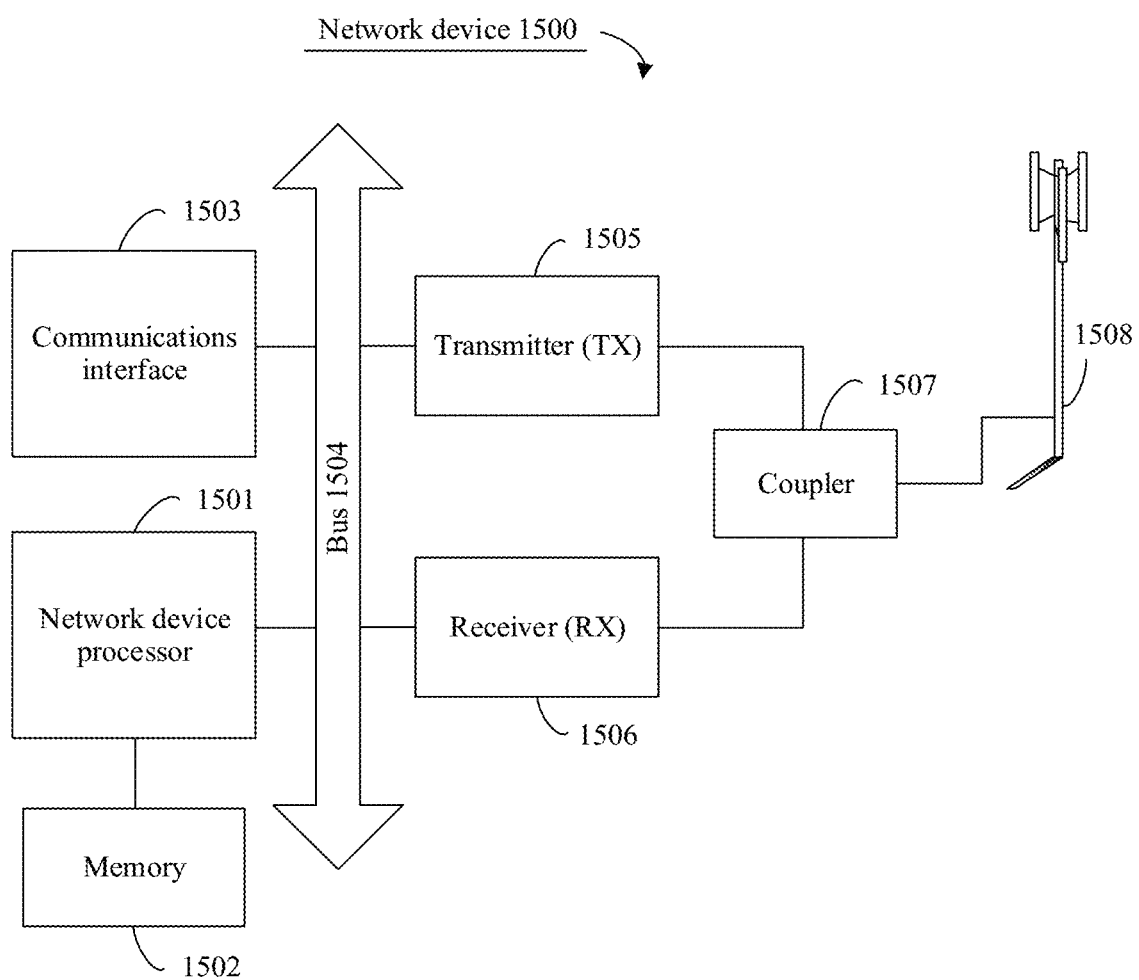
FIG. 15 is a schematic structural diagram of another network device according to this application.

FIG. 15 shows a network device 1500 according to some embodiments of this application. As shown in FIG. 15, the network device 1500 may include one or more network device processors 1501, a memory 1502, a communications interface 1503, a transmitter 1505, a receiver 1506, a coupler 1507, and an antenna 1508. These components may be connected through a bus 1504 or in another manner. In FIG. 15, an example in which the components are connected through the bus is used. The transmitter 1505 is configured to implement a function of the sending unit 1301, and the receiver 1506 is configured to implement a function of the receiving unit 1302.

The communications interface 1503 may be used by the network device 1500 for communicating with another communications device, for example, a terminal device or another network device. For example, the terminal device may be the terminal device 1400 shown in FIG. 14. For example, the communications interface 1503 may be a long term evolution (LTE) (4G) communications interface, or may be a 5G communications interface or a future new radio communications interface. In addition to a wireless communications interface, the network device 1500 may further have a wired communications interface 1503 to support wired communication. For example, a backhaul connection between one network device 1500 and another network device 1500 may be a wired communication connection.

The transmitter 1505 may be configured to perform transmission processing, for example, signal modulation, on a signal output by the network device processor 1501. The receiver 1506 may be configured to perform reception processing, for example, signal demodulation, on a mobile communication signal received by the antenna 1508. In some embodiments of this application, the transmitter 1505 and the receiver 1506 may be considered as a wireless modem. The network device 1500 may include one or more transmitters 1505 and one or more receivers 1506. The antenna 1508 may be configured to convert electromagnetic energy in a transmission line into an electromagnetic wave in free space, or convert an electromagnetic wave in free space into electromagnetic energy in a transmission line. The coupler 1507 may be configured to split the mobile communication signal into a plurality of signals, and allocate the plurality of signals to the plurality of receivers 1506.

The memory 1502 is coupled to the network device processor 1501, and is configured to store various software programs and/or a plurality of groups of instructions. For example, the memory 1502 may include a high-speed random access memory, and may also include a nonvolatile memory, for example, one or more magnetic disk storage devices, a flash memory device, or another nonvolatile solid-state storage device. The memory 1502 may store an operating system (which is referred to as a system below), for example, an embedded operating system such as uCOS, VxWorks, or RTLinux. The memory 1502 may further store a network communications program. The network communications program may be used for communicating with one or more additional devices, one or more terminal devices, or one or more network devices.

The network device processor 1501 may be configured to manage a radio channel, establish and disconnect a call and a communication link, and provide cell handover control for a user in a local control area. For example, the network device processor 1501 may include: an administration module/communication module (Administration Module/Communication Module, AM/CM) (a center for speech channel switching and information exchange), a basic module (Basic Module, BM) (configured to implement call processing, signaling processing, radio resource management, radio link management, and circuit maintenance functions), a transcoder and submultiplexer (Transcoder and SubMultiplexer, TCSM) (configured to implement multiplexing/demultiplexing and transcoding functions), and the like.

In this embodiment of this application, the network device processor 1501 may be configured to read and execute a computer readable instruction. For example, the network device processor 1501 may be configured to invoke a program stored in the memory 1502, for example, a program for implementing, on a network device 1500 side, the communication method provided in one or more embodiments of this application, and execute an instruction included in the program.

It may be understood that the network device 1500 may be the base station 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 1500 shown in FIG. 15 is merely an implementation of the embodiments of this application, and in actual application, the network device 1500 may further include more or fewer components. This is not limited herein.

An embodiment of this application provides a computer-readable storage medium. The computer-readable storage medium stores a computer program, and the computer program includes a program instruction. A processor executes the program instruction to perform the following operations: determining a first transmit power of first information to be sent in a first time unit on a first carrier and a second transmit power of second information to be sent in a second time unit on a second carrier, where the first time unit and the second time unit at least partially overlap, a time period that overlaps the first time unit in the second time unit is a first time period, and a time period that does not overlap the first time unit in the second time unit is a second time period; if a sum of the first transmit power and the second transmit power is greater than or equal to a maximum transmit power, determining a third transmit power of the second information to be sent in the first time period, where the third transmit power is less than the second transmit power; and sending the second information in the second time period by using the second transmit power or the third transmit power, and sending the second information in the first time period by using the third transmit power.

Another embodiment of this application provides a computer-readable storage medium. The computer-readable storage medium stores a computer program, and the computer program includes a program instruction. A processor executes the program instruction to perform the following operations: sending, by a network device, indication information to a terminal device, where the indication information is used to indicate a priority of first information and a priority of second information, the first information is information to be sent by the terminal device in a first time unit on a first carrier by using a first transmit power, the second information is information to be sent by the terminal device in a second time unit on a second carrier by using a second transmit power, the first time unit and the second time unit at least partially overlap, a time period that overlaps the first time unit in the second time unit is a first time period, and a time period that does not overlap the first time unit in the second time unit is a second time period; and receiving, in the second time period, the second information that is sent by the terminal device by using the second transmit power or a third transmit power, and receiving, in the first time period, the second information that is sent by the terminal device by using the third transmit power, where the third transmit power is less than the second transmit power.

All or some of the foregoing embodiments may be implemented by using software, hardware, firmware, or any combination thereof. When the software is used to implement the embodiments, the foregoing embodiments may be implemented completely or partially in a form of a computer program product. The computer program product includes one or more computer instructions. When the computer program instructions are loaded or executed on a computer, the foregoing procedures or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (solid state drive, SSD).

The foregoing descriptions are merely specific implementations of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   determining a first transmit power for transmitting first information in a first time unit on a first carrier and a second transmit power for transmitting second information in a second time unit on a second carrier, wherein the first time unit and the second time unit at least partially overlap, a time period that overlaps the first time unit in the second time unit is a first time period, and a time period that does not overlap the first time unit in the second time unit is a second time period;
   determining a third transmit power for transmitting the second information in the first time period; and
   transmitting the second information in the second time period using the second transmit power or the third transmit power, and transmitting the second information in the first time period using the third transmit power;
   wherein the first information and the second information are sounding reference signals (SRSs) of a same type, and the type is one of periodic or aperiodic;
   wherein the first carrier is a TDD (time division duplex) carrier or an FDD (frequency division duplex) carrier, and the second carrier is an SUL (supplementary uplink) carrier.

2. The communication method according to claim 1, wherein determining the third transmit power for transmitting the second information in the first time period comprises:
   if a sum of the first transmit power and the second transmit power is greater than or equal to a maximum transmit power, determining the third transmit power for transmitting the second information in the first time period, wherein the third transmit power is less than the second transmit power.

3. The communication method according to claim 1, wherein
   the first carrier is a supplementary uplink (SUL) carrier, and the second carrier is a time division duplex (TDD) carrier or a frequency division duplex (FDD) carrier; or
   a subcarrier spacing of the first carrier is less than a subcarrier spacing of the second carrier.

4. The communication method according to claim 1, wherein the method further comprises:
   receiving indication information from a network device, wherein
   the indication information is configured to indicate that a priority of the first carrier is higher than a priority of the second carrier, wherein
   the first carrier is a supplementary uplink (SUL) carrier, and the second carrier is a time division duplex (TDD) carrier or a frequency division duplex (FDD) carrier;
   the first carrier is a TDD carrier or a FDD carrier, and the second carrier is a SUL carrier;
   a subcarrier spacing of the first carrier is less than a subcarrier spacing of the second carrier; or
   a subcarrier spacing of the first carrier is greater than a subcarrier spacing of the second carrier; and, wherein
   determining the third transmit power for transmitting the second information in the first time period comprises:
   when determining, based on the indication information, that a priority of the first information is higher than a priority of the second information, determining the third transmit power of the second information to be sent in the first time period.

5. The communication method according to claim 1, wherein the method further comprises:
   receiving first control information and second control information from a network device, wherein the first control information is configured to indicate a priority of the first information, and the second control information is used to indicate a priority of the second information; and, wherein
   determining the third transmit power for transmitting the second information in the first time period comprises:
   when determining, based on the first control information and the second control information, that the priority of the first information is higher than the priority of the second information, determining the third transmit power for transmitting the second information in the first time period.

6. The communication method according to claim 5, wherein at least one of the following is true:
   the first control information comprises a first field, and the first field indicates the priority of the first information;
   the second downlink control information comprises a second field, and the second field indicates the priority of the second information;
   a first mask indicates the priority of the first information; the first mask is a cyclic redundancy check mask in the first control information; or
   a second mask indicates the priority of the second information, and the second mask is a cyclic redundancy check mask in the second control information.

7. The communication method according to claim 1, wherein sending the second information in the second time period using the second transmit power or the third transmit power comprises:
   when a demodulation reference signal is separately comprised in the first time period and the second time period, sending the second information in the second time period using the second transmit power;
   when a demodulation reference signal is not comprised in one of the first time period and the second time period, sending the second information in the second time period using the third transmit power;
   when a modulation scheme of the second information is quadrature amplitude modulation, sending the second information in the second time period using the second transmit power; and
   when a modulation scheme corresponding to the second information is phase shift keying modulation, sending the second information in the second time period by using the third transmit power.

8. The communication method according to claim 1, wherein sending the second information in the second time period using the second transmit power or the third transmit power comprises:
   when a demodulation reference signal is separately comprised in the first time period and the second time period, and/or a modulation scheme corresponding to the second information is phase shift keying modulation, sending the second information in the second time period by using the second transmit power; and
   when a demodulation reference signal is not comprised in one of the first time period and the second time period, and a modulation scheme of the second information is quadrature amplitude modulation, sending the second information in the second time period by using the third transmit power.

9. A terminal device, comprising:
a first determining circuit, configured to determine a first transmit power for transmitting first information in a first time unit on a first carrier and a second transmit power for transmitting second information in a second time unit on a second carrier, wherein the first time unit and the second time unit at least partially overlap, a time period that overlaps the first time unit in the second time unit is a first time period, and a time period that does not overlap the first time unit in the second time unit is a second time period;
a second determining circuit, configured to determine a third transmit power for transmitting the second information in the first time period; and
a transmitter, configured to: send the second information in the second time period using the second transmit power or the third transmit power, and send the second information in the first time period using the third transmit power;
wherein the first information and the second information are sounding reference signals (SRSs) of a same type, and wherein the type is one of periodic or aperiodic;
wherein the first carrier is a TDD carrier or an FDD carrier, and the second carrier is an SUL carrier.

10. The terminal device according to claim 9, wherein the second determining circuit is configured to: if a sum of the first transmit power and the second transmit power is greater than or equal to a maximum transmit power, determine the third transmit power of the second information to be sent in the first time period, wherein the third transmit power is less than the second transmit power.

11. The terminal device according to claim 10, wherein the first carrier is a supplementary uplink (SUL) carrier, and the second carrier is a time division duplex (TDD) carrier or a frequency division duplex (FDD) carrier; or
a subcarrier spacing of the first carrier is less than a subcarrier spacing of the second carrier.

12. The terminal device according to claim 9, wherein the terminal device further comprises:
a first receiving circuit, configured to receive indication information from a network device, wherein
the indication information is configured to indicate that a priority of the first carrier is higher than a priority of the second carrier, wherein
the first carrier is a supplementary uplink (SUL) carrier, and the second carrier is a time division duplex (TDD) carrier or a frequency division duplex (FDD) carrier;
the first carrier is a time division duplex TDD carrier or a frequency division duplex FDD carrier, and the second carrier is a supplementary uplink SUL carrier; or a subcarrier spacing of the first carrier is less than a subcarrier spacing of the second carrier; or
a subcarrier spacing of the first carrier is greater than a subcarrier spacing of the second carrier; and
the second determining circuit is configured to: when determining, based on the indication information, that a priority of the first information is higher than a priority of the second information, determine the third transmit power of the second information to be sent in the first time period.

13. The terminal device according to claim 9, wherein the terminal device further comprises:
a second receiving circuit, configured to receive first control information and second control information from a network device, wherein the first control information is configured to indicate a priority of the first information, and the second control information is configured to indicate a priority of the second information; and
the second determining circuit is configured to: when determining, based on the first control information and the second control information, that the priority of the first information is higher than the priority of the second information, determine the third transmit power for transmitting the second information in the first time period.

14. The terminal device according to claim 13, wherein at least one of the following is true:
the first control information comprises a first field, and the first field indicates the priority of the first information;
the second downlink control information comprises a second field, and the second field indicates the priority of the second information;
a first mask indicates the priority of the first information, and the first mask is cyclic redundancy check mask in the first control information; or
a second mask indicates the priority of the second information, and the second mask is acyclic redundancy check mask in the second control information.

15. The terminal device according to claim 9, wherein
the transmitter is configured to: when a demodulation reference signal is separately comprised in the first time period and the second time period, send the second information in the second time period using the second transmit power;
when a demodulation reference signal is not comprised in one of the first time period and the second time period, send the second information in the second time period using the third transmit power;
when a modulation scheme of the second information is quadrature amplitude modulation, send the second information in the second time period by using the second transmit power; and
when a modulation scheme corresponding to the second information is phase shift keying modulation, send the second information in the second time period by using the third transmit power.

16. The terminal device according to claim 9, wherein
the transmitter is configured to: when a demodulation reference signal is separately comprised in the first time period and the second time period, and/or a modulation scheme corresponding to the second information is phase shift keying modulation, send the second information in the second time period by using the second transmit power; or
when a demodulation reference signal is not comprised in one of the first time period and the second time period, and a modulation scheme of the second information is quadrature amplitude modulation, send the second information in the second time period by using the third transmit power.

17. A terminal device, comprising a processor, a transceiver, and a memory, wherein the processor and the memory are connected to each other, the memory is configured to store a computer program, the computer program comprises a program instruction, and the processor is configured to invoke the program instruction to perform the method according to claim 1.

* * * * *

UNITED STATES PATENT AND TRADEMARK OFFICE
CERTIFICATE OF CORRECTION

PATENT NO. : 11,510,155 B2
APPLICATION NO. : 17/013524
DATED : November 22, 2022
INVENTOR(S) : Xinqian Xie et al.

It is certified that error appears in the above-identified patent and that said Letters Patent is hereby corrected as shown below:

In the Claims

In Column 33, Lines 23-24, in Claim 9, delete "wherein the first carrier is a TDD carrier or an FDD carrier, and the second carrier is an SUL carrier." and insert -- wherein the first carrier is a TDD (time division duplex) carrier or an FDD (frequency division duplex) carrier, and the second carrier is an SUL (supplementary uplink) carrier. --.

Signed and Sealed this
Seventeenth Day of January, 2023

Katherine Kelly Vidal
*Director of the United States Patent and Trademark Office*